US012452787B2

(12) United States Patent
Kwon et al.

(10) Patent No.: US 12,452,787 B2
(45) Date of Patent: *Oct. 21, 2025

(54) SYSTEM AND METHOD FOR CONTROL CHANNEL RECEPTION IN POWER SAVE MODE

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

This patent is subject to a terminal disclaimer.

(21) Appl. No.: 18/150,858

(22) Filed: Jan. 6, 2023

(65) Prior Publication Data

US 2023/0145663 A1    May 11, 2023

Related U.S. Application Data

(63) Continuation of application No. 17/280,558, filed as application No. PCT/CN2019/087883 on May 22, 2019, now Pat. No. 11,553,430.

(Continued)

(51) Int. Cl.
*H04W 52/02* (2009.01)
*H04W 72/044* (2023.01)
(Continued)

(52) U.S. Cl.
CPC ..... *H04W 52/0232* (2013.01); *H04W 72/046* (2013.01); *H04W 74/0841* (2013.01); *H04W 74/0866* (2013.01)

(58) Field of Classification Search
CPC ......... H04W 52/0232; H04W 52/0216; H04W 52/0229; H04W 72/046; H04W 74/0841;
(Continued)

(56) References Cited

U.S. PATENT DOCUMENTS

2006/0133408 A1    6/2006  Nogueira-Nine et al.
2012/0280792 A1   11/2012  Andersen et al.
(Continued)

FOREIGN PATENT DOCUMENTS

CN    101557408 A    10/2009
CN    103636264 A     3/2014
(Continued)

OTHER PUBLICATIONS

"3rd Generation Partnership Project; Technical Specification Group Services and System Aspects; Release 15 Description; Summary of Rel-15 Work Items (Release 15)", 3GPP TR 21.915 V0.2.0, Jul. 2018, 89 Pages.

(Continued)

*Primary Examiner* — Ricardo H Castaneyra
(74) *Attorney, Agent, or Firm* — Slater Matsil, LLP

(57) ABSTRACT

A method implemented by an access node includes transmitting, by the access node, a wake up signal (WUS) prior to a control channel occurring within an associated discontinuous reception (DRX) ON period, wherein the WUS is transmitted using a first beam, and transmitting, by the access node, the control channel during the associated DRX ON period, wherein the control channel is transmitted on a control resource set (CORESET) using a second beam, wherein the first and second beams share a common quasi-colocated (QCL) source.

32 Claims, 9 Drawing Sheets

Related U.S. Application Data

(60) Provisional application No. 62/736,778, filed on Sep. 26, 2018, provisional application No. 62/830,010, filed on Apr. 5, 2019.

(51) Int. Cl.
*H04W 74/08* (2009.01)
*H04W 74/0833* (2024.01)

(58) Field of Classification Search
CPC .................. H04W 74/0866; H04W 76/28; H04L 5/0057; Y02D 30/70
USPC ............... 370/311, 329; 455/458, 574, 522
See application file for complete search history.

(56) References Cited

U.S. PATENT DOCUMENTS

| | | |
|---|---|---|
| 2017/0367069 A1 | 12/2017 | Agiwal et al. |
| 2018/0263048 A1 | 9/2018 | Ingale et al. |
| 2020/0092814 A1 | 3/2020 | Zhou et al. |
| 2021/0092681 A1* | 3/2021 | Nory ............... H04W 76/28 |

FOREIGN PATENT DOCUMENTS

| | | |
|---|---|---|
| CN | 104956606 A | 9/2015 |
| CN | 107534937 A | 1/2018 |
| CN | 108012329 A | 5/2018 |
| WO | 2014065535 A1 | 5/2014 |
| WO | 2018063467 A1 | 4/2018 |
| WO | 2018132100 A1 | 7/2018 |

OTHER PUBLICATIONS

Huawei, et al., "Design considerations for UE power saving", 3GPP TSG RAN WG1 Meeting #93, R1-1807306, May 21-25, 2018, 4 Pages, Busan, Korea.

Nokia, et al., "Wake-up signal configurations and procedures", 3GPP TSG RAN WG1 Meeting #92bis, R1-1804249, Apr. 16-20, 2018, 8 Pages, Sanya, China.

Sony, "Wake up signalling for efeMTC", 3GPP TSG RAN WG1 Meeting #90, R1-1714576, Aug. 21-25, 2017, 13 Pages, Prague, Czech Republic.

* cited by examiner

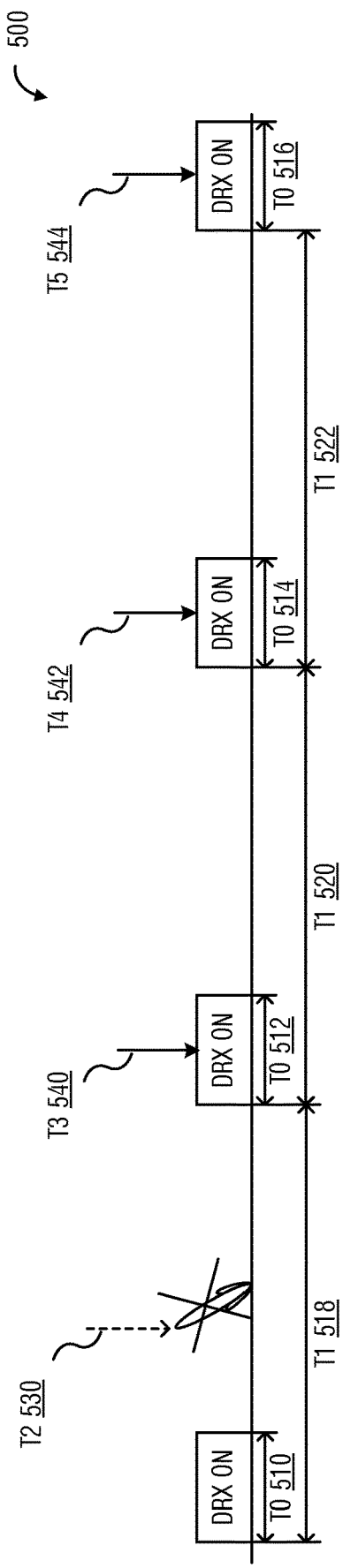
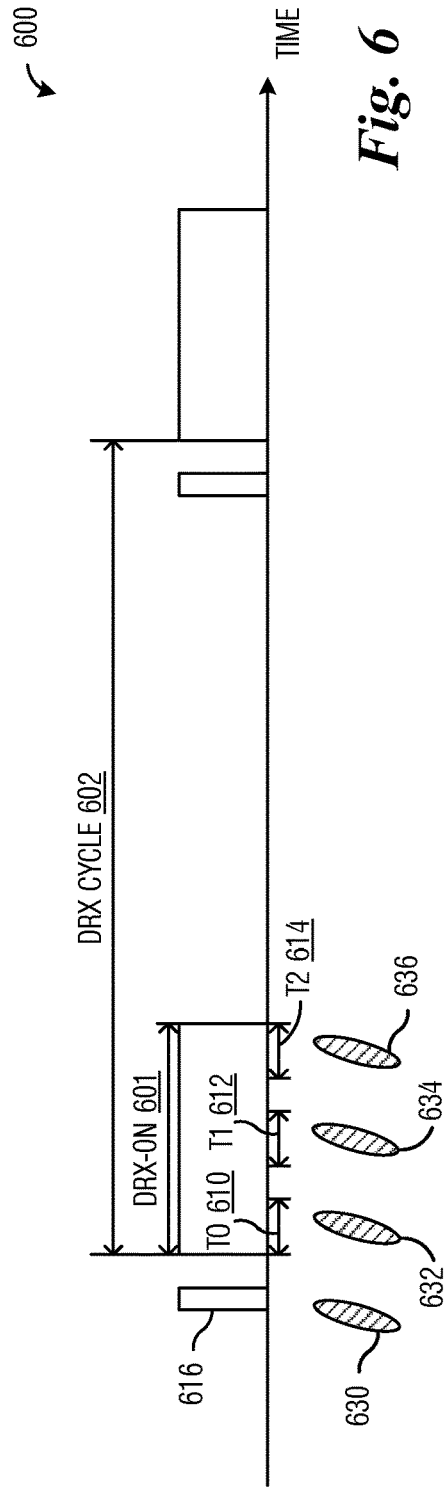

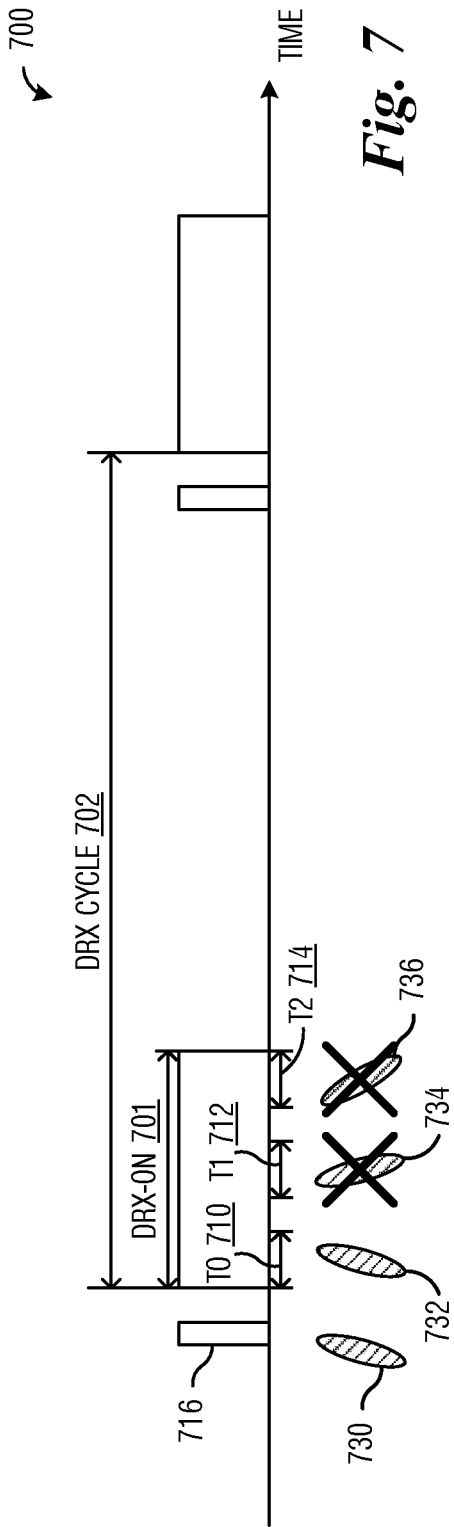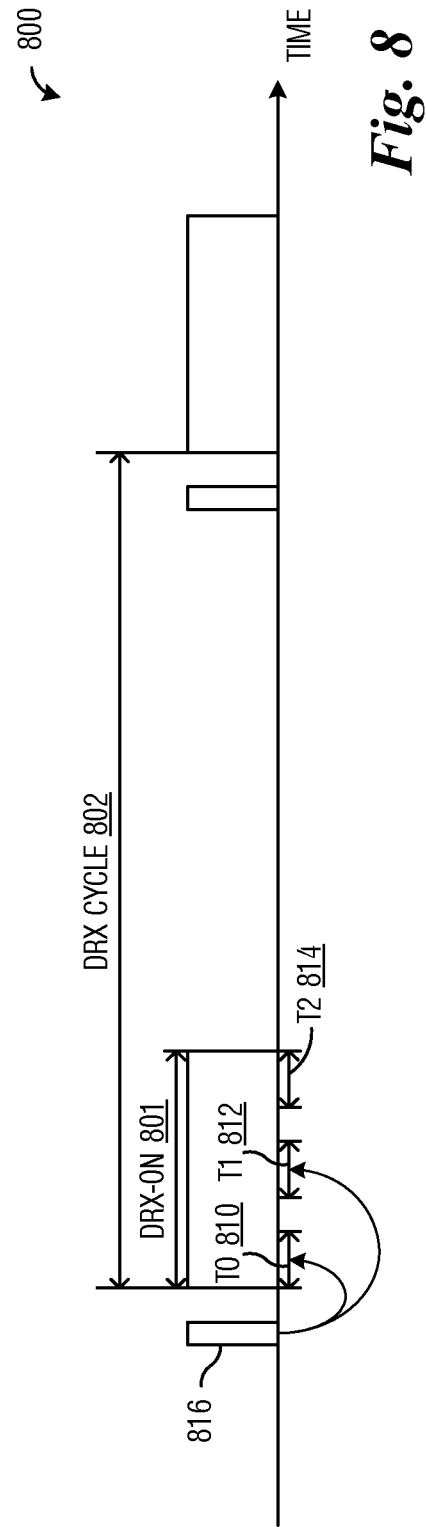

SYSTEM AND METHOD FOR CONTROL CHANNEL RECEPTION IN POWER SAVE MODE

CROSS-REFERENCE TO RELATED APPLICATIONS

This patent application is a continuation of U.S. patent application Ser. No. 17/280,558, filed on Mar. 26, 2021, entitled "System and Method for Control Channel Reception in Power Save Mode," now U.S. Pat. No. 11,553,430 issued on Jan. 10, 2023, which is a national phase filing under section 371 of PCT Application PCT/CN2019/087883, filed on May 22, 2019, entitled "System and Method for Control Channel Reception in Power Save Mode," which claims the benefit of U.S. Provisional Application No. 62/736,778, filed on Sep. 26, 2018, entitled "Apparatus and Methods for Control Channel Reception in Power Save Mode," and U.S. Provisional Application No. 62/830,010, filed on Apr. 5, 2019, entitled "System and Method for Control Channel Reception in Power Save Mode," which application are hereby incorporated herein by reference in their entireties.

TECHNICAL FIELD

The present disclosure relates generally to a system and method for digital communications, and, in particular embodiments, to a system and method for control channel reception in power save mode.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

However, the beams are prone to blockage. Therefore, a beam that is being used for communications may become blocked and fail, leaving the communications device without a connection. Therefore, there is a need for systems and methods for control channel reception with discontinuous reception feature to further save power consumption.

SUMMARY

According to a first aspect, a method implemented by an access node is provided. The method includes transmitting, by the access node, a wake up signal (WUS) prior to a control channel occurring within an associated discontinuous reception (DRX) ON period, wherein the WUS is transmitted using a first beam, and transmitting, by the access node, the control channel during the associated DRX ON period, wherein the control channel is transmitted on a control resource set (CORESET) using a second beam, wherein the first and second beams share a common quasi-colocated (QCL) source.

In a first implementation form of the method according to the first aspect as such, wherein the WUS is transmitted prior to the associated DRX ON period.

In a second implementation form of the method according to the first aspect as such or any preceding implementation form of the first aspect, wherein the CORESET is one of a plurality of CORESETs associated with the DRX ON period, and wherein all CORESETs of the plurality of CORESETs share the common QCL source.

In a third implementation form of the method according to the first aspect as such or any preceding implementation form of the first aspect, wherein the CORESET is one of a plurality of CORESETs associated with the DRX ON period, and wherein the CORESET is a predetermined CORESET.

In a fourth implementation form of the method according to the first aspect as such or any preceding implementation form of the first aspect, wherein the CORESET comprises one of a first CORESET of the associated DRX ON period, a CORESET with a specified identifier, a CORESET with a lowest identifier in the plurality of CORESETs, a CORESET with a highest identifier in the plurality of CORESETs, a CORESET last successfully received by a user equipment (UE), a CORESET that is associated with a UE specific search space, a CORESET that is associated with a specified common search space, or a CORESET that is associated with a search space scheduled in the associated DRX ON period.

In a fifth implementation form of the method according to the first aspect as such or any preceding implementation form of the first aspect, wherein the WUS indicates a search space where the control channel will be located or a CORESET on which the control channel will be transmitted.

In a sixth implementation form of the method according to the first aspect as such or any preceding implementation form of the first aspect, wherein the WUS indicates that the control channel will be transmitted in a CORESET.

In a seventh implementation form of the method according to the first aspect as such or any preceding implementation form of the first aspect, further comprising configuring, by the access node, a transmission configuration indication (TCI) state for each CORESET of the plurality of CORESETs.

In an eighth implementation form of the method according to the first aspect as such or any preceding implementation form of the first aspect, further comprising configuring, by the access node, a TCI state for the WUS, wherein the TCI state of the WUS and the TCI state of the CORESET are the same.

In a second implementation form of the method according to the first aspect as such or any preceding implementation form of the first aspect, wherein all CORESETs of the plurality of CORESETs are configured with the same TCI state.

According to a second aspect, a method implemented by a UE is provided. The method includes receiving, by the UE, a first WUS using a first beam, wherein the first WUS is associated with a first DRX ON period, and receiving, by the UE, a first control channel during the associated first DRX ON period, wherein the first control channel is received on a first CORESET using a second beam, wherein the first WUS and first control channel share a common QCL source.

In a first implementation form of the method according to the second aspect as such, wherein the first CORESET is one of a plurality of first CORESETs associated with the first DRX ON period, and wherein all first CORESETs of the plurality of first CORESETs share the common QCL source.

In a second implementation form of the method according to the second aspect as such or any preceding implementation form of the second aspect, wherein the first CORESET is one of a plurality of first CORESETs associated with the first DRX ON period, and wherein the first CORESET is a predetermined first CORESET.

In a third implementation form of the method according to the second aspect as such or any preceding implementation form of the second aspect, wherein the first CORESET comprises one of a first appearing CORESET of the associated first DRX ON period, a first CORESET with a specified identifier, a first CORESET with a lowest identifier in the plurality of first CORESETs, a first CORESET with a highest identifier in the plurality of first CORESETs, a first CORESET last successfully received by a UE, a first CORESET that is associated with a UE specific search space, a first CORESET that is associated with a specified common search space, or a first CORESET that is associated with a search space scheduled in the associated first DRX ON period.

In a fourth implementation form of the method according to the second aspect as such or any preceding implementation form of the second aspect, wherein the WUS indicates a search space where the first control channel will be located or a first CORESET on which the control channel will be transmitted.

In a fifth implementation form of the method according to the second aspect as such or any preceding implementation form of the second aspect, wherein the WUS indicates that the control channel will be transmitted on a first CORESET.

In a sixth implementation form of the method according to the second aspect as such or any preceding implementation form of the second aspect, further comprising receiving, by the UE, a TCI state for each first CORESET of the plurality of first CORESETs.

In a seventh implementation form of the method according to the second aspect as such or any preceding implementation form of the second aspect, further comprising receiving, by the UE, a TCI state for the WUS, wherein the TCI state of the WUS and the TCI state of the first CORESET are the same.

In an eighth implementation form of the method according to the second aspect as such or any preceding implementation form of the second aspect, wherein all first CORESETs of the plurality of first CORESETs are configured with the same TCI state.

In a ninth implementation form of the method according to the second aspect as such or any preceding implementation form of the second aspect, further includes receiving, by the UE, a second WUS using a third beam, wherein the second WUS is associated with a second DRX ON period, failing, by the UE, to successfully receive a second control channel during the associated second DRX ON period, and transmitting, by the UE, a packet to indicate a request for a beam update procedure.

In a tenth implementation form of the method according to the second aspect as such or any preceding implementation form of the second aspect, wherein transmitting the packet includes selecting, by the UE, a random access preamble, and transmitting, by the UE, the random access preamble in the packet.

In an eleventh implementation form of the method according to the second aspect as such or any preceding implementation form of the second aspect, wherein transmitting the packet includes transmitting, by the UE, a random access preamble allocated for indicating control channel failure in the packet.

In a twelfth implementation form of the method according to the second aspect as such or any preceding implementation form of the second aspect, wherein the packet is transmitted using the third beam.

In a thirteenth implementation form of the method according to the second aspect as such or any preceding implementation form of the second aspect, further includes determining, by the UE, that a MAC entity is in an Active Time state during a scheduled time associated with a third DRX ON period, and based thereon, deactivating, by the UE, WUS receiving during the scheduled time.

In a fourteenth implementation form of the method according to the second aspect as such or any preceding implementation form of the second aspect, further includes identifying, by the UE, that a second CORESET is not scheduled during a third DRX ON period, and deactivating, by the UE, WUS receiving on the second CORESET.

According to a third aspect, an access node is provided. The access node includes a non-transitory memory storage comprising instructions, and one or more processors in communication with the memory storage. The one or more processors execute the instructions to transmit a WUS prior to a control channel occurring within an associated DRX ON period, wherein the WUS is transmitted using a first beam, and transmit the control channel during the associated DRX ON period, wherein the control channel is transmitted on a CORESET using a second beam, wherein the first and second beams share a common QCL source.

In a first implementation form of the access node according to the third aspect as such, wherein the WUS is transmitted prior to the associated DRX ON period.

In a second implementation form of the access node according to the third aspect as such or any preceding implementation form of the third aspect, wherein the CORESET is one of a plurality of CORESETs associated with the DRX ON period, and wherein all CORESETs of the plurality of CORESETs share the common QCL source.

In a third implementation form of the access node according to the third aspect as such or any preceding implementation form of the third aspect, wherein the CORESET is one of a plurality of CORESETs associated with the DRX ON period, and wherein the CORESET is a predetermined CORESET.

In a fourth implementation form of the access node according to the third aspect as such or any preceding implementation form of the third aspect, wherein the CORESET comprises one of a first CORESET of the associated DRX ON period, a CORESET with a specified identifier, a CORESET with a lowest identifier in the plurality of CORESETs, a CORESET with a highest identifier in the plurality of CORESETs, a CORESET last successfully received by a UE, a CORESET that is associated with a UE specific search space, a CORESET that is associated with a specified common search space, or a CORESET that is associated with a search space scheduled in the associated DRX ON period.

In a fifth implementation form of the access node according to the third aspect as such or any preceding implementation form of the third aspect, wherein the WUS indicates a search space where the control channel will be located or a CORESET on which the control channel will be transmitted.

In a sixth implementation form of the access node according to the third aspect as such or any preceding implementation form of the third aspect, wherein the WUS indicates that the control channel will be transmitted in a CORESET.

In a seventh implementation form of the access node according to the third aspect as such or any preceding implementation form of the third aspect, wherein the one or more processors further execute the instructions to configure a TCI state for each CORESET of the plurality of CORESETs.

In an eighth implementation form of the access node according to the third aspect as such or any preceding implementation form of the third aspect, wherein the one or more processors further execute the instructions to configure a TCI state for the WUS, wherein the TCI state of the WUS and the TCI state of the CORESET are the same.

In a ninth implementation form of the access node according to the third aspect as such or any preceding implementation form of the third aspect, wherein all CORESETs of the plurality of CORESETs are configured with the same TCI state.

According to a fourth aspect, a UE is provided. The UE includes a non-transitory memory storage comprising instructions, and one or more processors in communication with the memory storage. The one or more processors execute the instructions to receive a first WUS using a first beam, wherein the first WUS is associated with a first DRX ON period, and receive a first control channel during the associated first DRX ON period, wherein the first control channel is received on a first CORESET using a second beam, wherein the first WUS and first control channel share a common QCL source.

In a first implementation form of the UE according to the fourth aspect as such, wherein the first CORESET is one of a plurality of first CORESETs associated with the first DRX ON period, and wherein all first CORESETs of the plurality of first CORESETs share the common QCL source.

In a second implementation form of the UE according to the fourth aspect as such or any preceding implementation form of the fourth aspect, wherein the first CORESET is one of a plurality of first CORESETs associated with the first DRX ON period, and wherein the first CORESET is a predetermined first CORESET.

In a third implementation form of the UE according to the fourth aspect as such or any preceding implementation form of the fourth aspect, wherein the first CORESET comprises one of a first appearing CORESET of the associated first DRX ON period, a first CORESET with a specified identifier, a first CORESET with a lowest identifier in the plurality of first CORESETs, a first CORESET with a highest identifier in the plurality of first CORESETs, a first CORESET last successfully received by a UE, a first CORESET that is associated with a UE specific search space, a first CORESET that is associated with a specified common search space, or a first CORESET that is associated with a search space scheduled in the associated first DRX ON period.

In a fourth implementation form of the UE according to the fourth aspect as such or any preceding implementation form of the fourth aspect, wherein the WUS indicates a search space where the first control channel will be located or a first CORESET on which the control channel will be transmitted.

In a fifth implementation form of the UE according to the fourth aspect as such or any preceding implementation form of the fourth aspect, wherein the WUS indicates that the control channel will be transmitted on a first CORESET.

In a sixth implementation form of the UE according to the fourth aspect as such or any preceding implementation form of the fourth aspect, wherein the one or more processors further execute the instructions to receive a TCI state for each first CORESET of the plurality of first CORESETs.

In a seventh implementation form of the UE according to the fourth aspect as such or any preceding implementation form of the fourth aspect, wherein the one or more processors further execute the instructions to receive a TCI state for the WUS, wherein the TCI state of the WUS and the TCI state of the first CORESET are the same.

In an eighth implementation form of the UE according to the fourth aspect as such or any preceding implementation form of the fourth aspect, wherein all first CORESETs of the plurality of first CORESETs are configured with the same TCI state.

In a ninth implementation form of the UE according to the fourth aspect as such or any preceding implementation form of the fourth aspect, wherein the one or more processors further execute the instructions to receive a second WUS using a third beam, wherein the second WUS is associated with a second DRX ON period, fail to successfully receive a second control channel during the associated second DRX ON period, and transmit a packet to indicate a request for a beam update procedure.

In a tenth implementation form of the UE according to the fourth aspect as such or any preceding implementation form of the fourth aspect, wherein the one or more processors further execute the instructions to select a random access preamble, and transmit the random access preamble in the packet.

In an eleventh implementation form of the UE according to the fourth aspect as such or any preceding implementation form of the fourth aspect, wherein the one or more processors further execute the instructions to transmit a random access preamble allocated for indicating control channel failure in the packet.

In a twelfth implementation form of the UE according to the fourth aspect as such or any preceding implementation form of the fourth aspect, wherein the packet is transmitted using the third beam.

In a thirteenth implementation form of the UE according to the fourth aspect as such or any preceding implementation form of the fourth aspect, wherein the one or more processors further execute the instructions to determine that a MAC entity is in an Active Time state during a scheduled time associated with a third DRX ON period, and based thereon, deactivate WUS receiving during the scheduled time.

In a fourteenth implementation form of the UE according to the fourth aspect as such or any preceding implementation form of the fourth aspect, wherein the one or more processors further execute the instructions to identify that a second CORESET is not scheduled during a third DRX ON period, and deactivate WUS receiving on the second CORESET.

An advantage of a preferred embodiment is that a receiving device can maintain the same spatial quasi-colocated source between wake-up signal and control resource set(s) in an associated discontinuous reception on period. Maintaining the same spatial quasi-colocated source enables the determination of whether or not a transmitting device transmitted a control channel.

Yet another advantage of a preferred embodiment is that wake-up signal and the control resource set(s) being transmitted with the same quasi-colocated source improves the probability of detecting the control channel.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a diagram of an example operation of PDCCH beam blocked during DRX operation;

FIG. 6 illustrates a diagram of a first example operation of QCL indication for each DRX cycle of a UE according to example embodiments presented herein;

FIG. 7 illustrates a diagram of a second example operation of QCL indication for each DRX cycle of a UE according to example embodiments presented herein;

FIG. 8 illustrates a diagram of an example operation of CORESET indication in WUS for each DRX cycle of a UE according to example embodiments presented herein;

DETAILED DESCRIPTION OF ILLUSTRATIVE EMBODIMENTS

The making and using of the disclosed embodiments are discussed in detail below. It should be appreciated, however, that the present disclosure provides many applicable concepts that can be embodied in a wide variety of specific contexts. The specific embodiments discussed are merely illustrative of specific ways to make and use the embodiments, and do not limit the scope of the disclosure.

Figure 1:
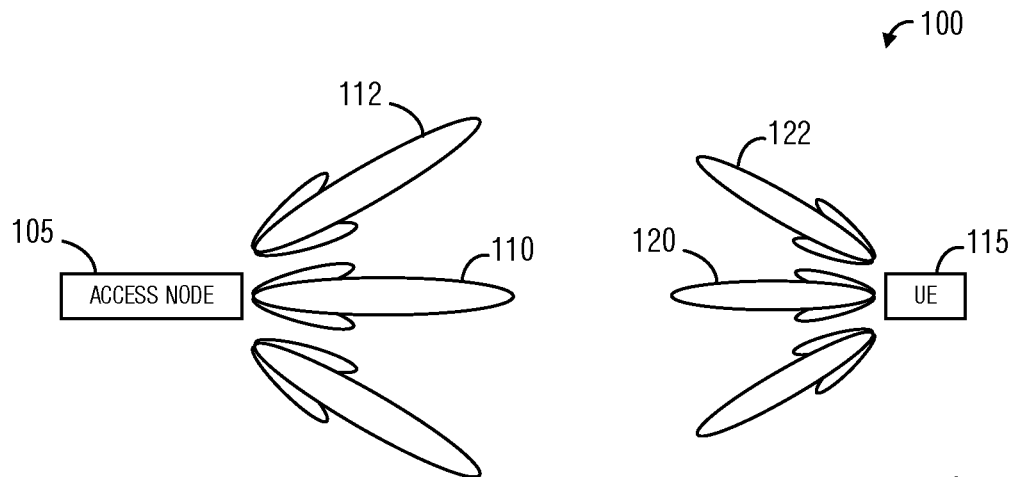
FIG. 1 illustrates an example communications system.

FIG. 1 illustrates an example communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mmWave)) operating frequencies is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
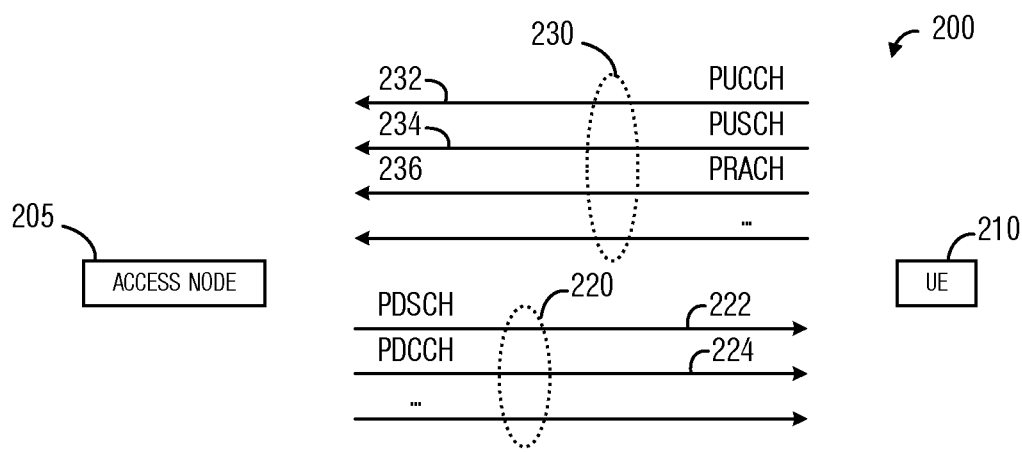
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

Figure 3:
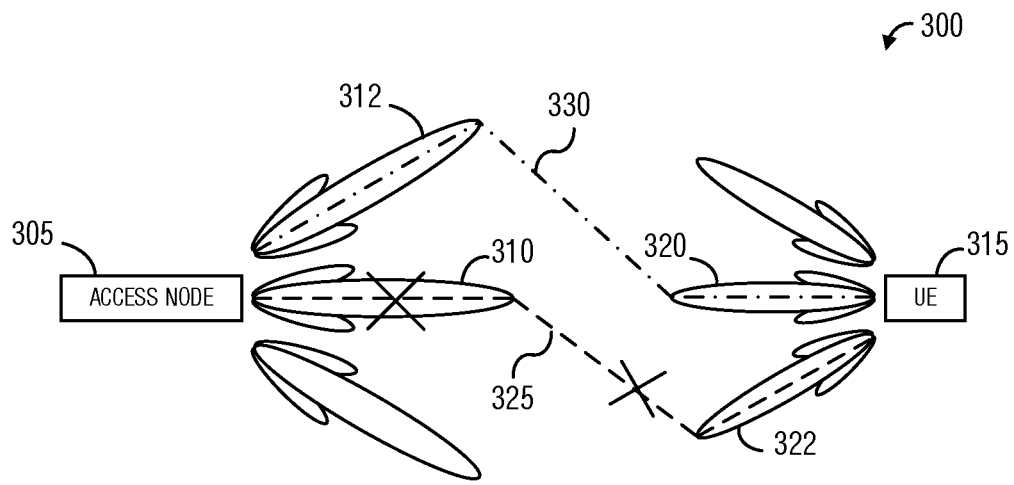
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi colocated (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

It is noted that as used in the discussion presented herein, the term QCL may generally refer to both QCL and spatial QCL. In circumstances where such usage would lead to confusion, spatial QCL will be used as needed.

At the Third Generation Partnership Project (3GPP) RAN1 AdHoc NR #3 meeting, mechanisms for sharing QCL information of downlink physical channels were discussed. Some agreements were made, including:

A UE is configured using radio resource control (RRC) messaging with a list of up to M candidate transmission configuration indication (TCI) states at least for the purposes of sharing QCL information;

Whether M is equal to or larger than 2N is for further study, where N is the size of a downlink control information (DCI) field for PDSCH;

Each TCI state may be configured with at least one reference signal (RS) set;

Each identifier (ID), with details of the ID for further study, for downlink RS at least for the purpose of spatial QCL in an RS set may refer to one of the following downlink RS types: synchronization signal block (SSB), periodic channel state information reference signal (CSI-RS), aperiodic CSI-RS, or semi-persistent CSI-RS;

Other RS, such as tracking reference signal (TRS), phase-tracking reference signal (PTRS), in an RS set depending on an outcome of discussions of QCL agenda item;

Mechanisms to initialize or update the ID of a downlink RS or RSs in the RS set used for (at least) spatial QCL purposes are for further study;

At least the two following mechanisms are for further study, (1) explicit signaling to the UE of the downlink RS(s) ID and corresponding TCI state, and (2) implicit association of the downlink RS(s) ID to a TCI state based on measurements by the UE;

Mechanisms used for different RS types are for further study;

Whether or not a TCI state includes other parameter(s), e.g., for PDSCH rate matching purposes, are for further study; and Value of N, where N is at most three bits, is for further study.

Additional details on the specification of more than one demodulation reference signal (DMRS) port group and more than one RS set per TCI are to be completed.

Also agreed upon at the 3GPP RAN1 AdHoc NR #3 meeting were:

The QCL configuration for PDCCH contains the information that provides a reference to a TCI state, with Alternate 1: the QCL configuration or representation thereof is on a per CORESET basis, with the UE applying the QCL assumption to the associated CORESET monitoring occasions. All search space(s) within the CORESET utilize the same QCL;

Alternate 2: The QCL configuration or representation thereof is on a per search space basis, with the UE applying the QCL assumption on an associated search space. Potentially meaning that in a situation where there are multiple search spaces with a CORESET, the UE may be configured with different QCL assumptions for different search spaces.

The sharing of QCL configuration is performed using RRC or RRC and a medium access control (MAC) control element (CE). Sharing of QCL configuration by DCI is for further study. The above assumptions are provided as input to the control channel discussion.

Also agreed upon were:

For sharing of QCL configuration of the PDSCH:

When TCI states are used for sharing of QCL configuration, the UE receives an N-bit TCI field in DCI, The UE assumes that the PDSCH DMRS is QCL with the downlink RS(s) in the RS set corresponding to the signaled TCI state. For further study, whether or not a QCL type is configured, and configuration details.

Whether or not the TCI field is always present in a given downlink-related DCI is for further study;

Whether or not the TCI field is in the same DCI as that containing the PDSCH scheduling assignment is for further study;

For further study, timing between when the UE receives a QCL configuration or representation thereof and a first time that the QCL assumption may be applied for demodulation of PDSCH or PDCCH.

At the 3GPP RAN1 #90bis meeting, mechanisms on sharing of QCL configuration for downlink physical channels were discussed, and the following agreements were made:

Initialization or update of the identifier of a downlink RS(s) in the RS set used at least for spatial QCL purposes is performed at least via explicit signaling. Explicit signaling using RRC or RRC+MAC CE are supported.

Implicit update via an implicit association of the downlink RS ID(s) to a TCI state based on measurements by a UE are for further study.

Also agreed upon at the 3GPP RAN1 #90bis meeting were:

In the situation when at least spatial QCL is configured or conveyed, higher layer UE-specific configuration of whether or not the TCI field is present in downlink-related DCI is supported.

If the TCI field is not present, no dynamic conveyance of QCL parameters for PDSCH is provided in downlink-related DCI. For PDSCH, a UE applies higher-layer signaling of QCL parameters or representation thereof for determining QCL parameters (details are for further study) except for the situation of beam management without beam-related information where no spatial QCL parameters are configured using higher layer signaling.

If the TCI field is present,

The TCI field is always present in the associated DCI for PDSCH scheduling, irrespective of same-slot scheduling or cross-slot scheduling.

If the scheduling offset is less than a threshold K, PDSCH uses a pre-configured, pre-defined, or rule-based spatial assumption (details are for further study). Also for further study, the other QCL parameters are still obtained from the N-bit TCI state field of the DCI, and how to update pre-configured or pre-defined spatial assumption (if applicable). The threshold K may be based on UE capability only if multiple candidate values of K are supported.

If the scheduling offset is greater than or equal to a threshold K, PDSCH uses the beam (a spatial QCL parameter) conveyed by the N-bit TCI field in the assignment DCI.

The proposed candidate solutions should consider below and above 6 GHz downlink beam related operation with and without beam information or downlink beam management with and without beam information.

However, this does not apply to the situation of beam management without beam-related information.

During the standardization activities of 3GPP Fifth Generation (5G) New Radio (NR), a Discontinuous Reception (DRX) operation mode is proposed for saving power consumption at the UE side. DRX operation mode is also sometimes referred to as connected mode discontinuous reception (C-DRX) operation mode. In DRX operation mode, a UE periodically wakes up in DRX ON periods and performs PDCCH reception, and goes to sleep during DRX OFF periods if no further action is dictated during the DRX ON periods.

The basic MAC layer operation for DRX utilizes the following parameters:

drx-onDurationTimer: the duration at the beginning of a DRX Cycle;
drx-SlotOffset: the delay before starting the drx-onDurationTimer;
drx-InactivityTimer: the duration after the PDCCH occasion in which a PDCCH indicates a new UL or DL transmission for the MAC entity;
drx-RetransmissionTimerDL (per DL HARQ process except for the broadcast process): the maximum duration until a DL retransmission is received;
drx-RetransmissionTimerUL (per UL HARQ process): the maximum duration until a grant for UL retransmission is received;
drx-LongCycleStartOffset: the Long DRX cycle and drx-StartOffset which defines the subframe where the Long and Short DRX Cycle starts;
drx-ShortCycle (optional): the Short DRX cycle;
drx-ShortCycleTimer (optional): the duration the UE shall follow the Short DRX cycle;
drx-HARQ-RTT-TimerDL (per DL HARQ process except for the broadcast process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer is running; or
a Scheduling Request is sent on PUCCH and is pending; or
a PDCCH indicating a new transmission addressed to the cell-radio network temporary identifier (C-RNTI) of the MAC entity has not been received after successful reception of a Random Access Response for the Random Access Preamble not selected by the MAC entity among the contention-based Random Access Preamble.

The basic MAC layer operation for DRX includes:

1>if a MAC protocol data unit (PDU) is received in a configured downlink assignment:
2>start the drx-HARQ-RTF-TimerDL for the corresponding HARQ process in the first symbol after the end of the corresponding transmission carrying the DL HARQ feedback;
2>stop the drx-RetransmissionTimerDL for the corresponding HARQ process.
1>if a MAC PDU is transmitted in a configured uplink grant:
2>start the drx-HARQ-RTT-TimerUL for the corresponding hybrid automatic repeat request (HARQ) process in the first symbol after the end of the first repetition of the corresponding PUSCH transmission;
2>stop the drx-RetransmissionTimerUL for the corresponding HARQ process.
1>if a drx-HARQ-RTT-TimerDL expires:
2>if the data of the corresponding HARQ process was not successfully decoded:
3>start the drx-RetransmissionTimerDL for the corresponding HARQ process in the first symbol after the expiry of drx-HARQ-RTT-TimerDL.
1>if a drx-HARQ-RTT-TimerUL expires:
2>start the drx-RetransmissionTimerUL for the corresponding HARQ process in the first symbol after the expiry of drx-HARQ-RTT-TimerUL.
1>if a DRX Command MAC CE or a Long DRX Command MAC CE is received:
2>stop drx-onDurationTimer;
2>stop drx-InactivityTimer.
1>if drx-InactivityTimer expires or a DRX Command MAC CE is received:

2>if the Short DRX cycle is configured:
3>start or restart drx-ShortCycleTimer in the first symbol after the expiry of drx-InactivityTimer or in the first symbol after the end of DRX Command MAC CE reception;
3>use the Short DRX Cycle.
2>else:
3>use the Long DRX cycle.
1>if drx-ShortCycleTimer expires:
2>use the Long DRX cycle.
1>if a Long DRX Command MAC CE is received:
2>stop drx-ShortCycleTimer;
2>use the Long DRX cycle.
1>if the Short DRX Cycle is used, and [(SFN×10)+ subframe number] modulo (drx-ShortCycle)=(drx-StartOffset) modulo (drx-ShortCycle); or
1>if the Long DRX Cycle is used, and [(SFN×10)+ subframe number] modulo (drx-LongCycle)=drx-StartOffset:
2>start drx-onDurationTimer after drx-SlotOffset from the beginning of the subframe.
1>if the MAC entity is in Active Time:
2>monitor the PDCCH;
2>if the PDCCH indicates a DL transmission:
3>start the drx-HARQ-RTT-TimerDL for the corresponding HARQ process in the first symbol after the end of the corresponding transmission carrying the DL HARQ feedback;
3>stop the drx-RetransmissionTimerDL for the corresponding HARQ process.
2>if the PDCCH indicates a UL transmission:
3>start the drx-HARQ-RTT-TimerUL for the corresponding HARQ process in the first symbol after the end of the first repetition of the corresponding PUSCH transmission;
3>stop the drx-RetransmissionTimerUL for the corresponding HARQ process.
2>if the PDCCH indicates a new transmission (DL or UL):
3>start or restart drx-InactivityTimer in the first symbol after the end of the PDCCH reception.
1>in current symbol n, if the MAC entity would not be in Active Time considering grants/assignments/DRX Command MAC CE/Long DRX Command MAC CE received and
Scheduling Request sent 4 ms prior to symbol n when evaluating all DRX Active Time conditions as specified
2>not transmit periodic SRS and semi-persistent SRS defined in TS 38.214, which is hereby incorporated herein by reference.
1>if CSI masking (csi-Mask) is setup by upper layers:
2>in current symbol n, if onDurationTimer would not be running considering grants/assignments/DRX Command MAC CE/Long DRX Command MAC CE received 4 ms prior to symbol n when evaluating all DRX Active Time conditions as specified:
3>not report CSI on PUCCH.
1>else:
2>in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified:
3>not report CSI on PUCCH and semi-persistent CSI on PUSCH.

Figure 4A:
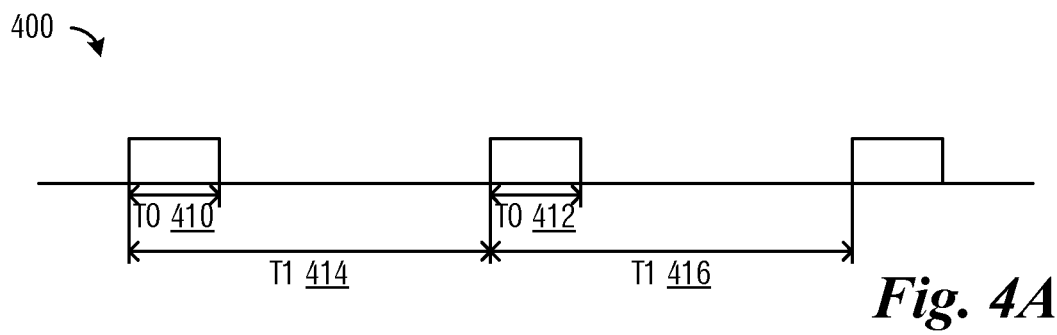
FIG. 4A illustrates a diagram of a first example of DRX operation, where only a Long DRX Cycle (drx-LongCycle) is configured and the serving access node does not send a PDCCH during a DRX ON duration.

FIG. 4A illustrates a diagram 400 of a first example of DRX operation, where only a Long DRX Cycle (drx-LongCycle) is configured and the serving access node does not send a PDCCH during a DRX ON duration. A UE switches its state between DRX ON state and DRX-OFF state based on access node configuration. When the UE is in DRX ON state, the UE monitors a wireless channel for a frame exchange. However, when the UE is in DRX OFF state, the UE is not required to monitor the wireless channel based on the assumption that a serving access node will not initiate data transmission during the DRX OFF state. For each long DRX cycle T1 414 and 416, the UE monitors PDCCH during T0 410 and 412 until a timer drx-onDurationTimer expires. After T0 410 and 412, when drx-onDurationTimer expires, the UE enters the DRX OFF state again and does not monitor the wireless channel. Therefore, during long DRX cycle T1 414 and 416, the UE only monitors the wireless channel during T0 410 and 412, which can save power consumption at the UE.

Figure 4B:
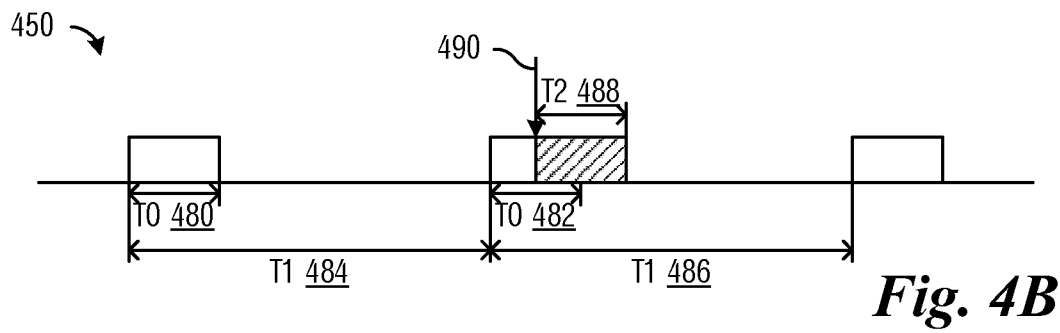
FIG. 4B illustrates a diagram of a second example of DRX operation, where only a long DRX Cycle (drx-LongCycle) is configured and the serving access node sends a PDCCH during a DRX ON duration.

FIG. 4B illustrates a diagram 450 of a second example of DRX operation, where only a long DRX Cycle (drx-LongCycle) is configured and the serving access node sends a PDCCH during a DRX ON duration. For each long DRX cycle T1 484 and 486, the UE monitors PDCCH during T0 480 and 482 until drx-onDurationTimer expires. If a PDCCH 490 is detected before drx-onDurationTimer expires, the UE monitors the wireless channel further during T2 488 until another timer (drx-InactivityTimer) expires to check for any follow up DL transmission. When drx-InactivityTimer expires and there is no follow up data exchange, then the UE enters the DRX-OFF state again and does not monitor the wireless channel.

The discussion of the example embodiments presented herein focusses on the Long DRX cycle case of DRX operation. In general, there are at least two cases of DRX operation, including Long DRX cycle (as described herein) and Short DRX cycle. The example embodiments presented herein are operable with Long DRX cycles, Short DRX cycles, or both Long and Short DRX cycles. Therefore, the focus on Long DRX cycle operation should not be construed as being limiting to either the scope or spirit of the example embodiments.

With the DRX operation mode, a UE can avoid continuous PDCCH monitoring and as a result, save power. However, in 5G NR operation scenarios, especially when high frequency (e.g., above 6 GHz) bands are used for 5G NR communication, the wireless channel or beam can be blocked while the UE is not monitoring the PDCCH (i.e., while the UE is asleep in a DRX OFF period) due to multiple reasons. For example, if a UE moves or changes its direction while the UE is not monitoring the PDCCH, or an object comes in between the UE and the access node, a transmit or receive beam may not be maintained because the wireless channel has changed.

FIG. 5 illustrates a diagram 500 of an example operation of PDCCH beam blocked during DRX operation. In the example operation shown in FIG. 5, only a Long DRX Cycle (drx-LongCycle) is configured for a UE, and UE will monitor PDCCH during DRX ON period. For each DRX cycle T1 518, 520, and 522, the UE monitors for PDCCHs during T0 510, 512, and 514 (T0 516 occurs during a subsequent DRX cycle) until drx-onDurationTimer expires. In this example, the blocking of a current beam used for PDCCH reception occurs at time T2 530 when the UE is in DRX OFF state, wherein the UE is asleep and does not identify that the blocking of the current beam used for PDCCH reception has occurred.

Because the UE does not identify that the blocking of the current beam used for PDCCH reception has occurred, the UE continues using the current beam for monitoring the PDCCH during upcoming DRX ON periods of T0 512, 514, and 516. In this example, a serving access node transmits a series of PDCCHs at T3 540, T4 542, and T5 544 each within T0 512-516 duration. However, because the blockage of the UE's current beam used for PDCCH reception occurred before the transmission of PDCCH from the serving access node but the UE keeps using the current beam for PDCCH monitoring during T0 512-516 periods, it is highly likely that the UE will not be able to successfully decode PDCCH that the serving access node sent at T3 540, T4 542, and T5 544.

Because the UE does not successfully decode PDCCH destined for the UE during T0 512-516, the UE goes back to DRX OFF state and stops monitoring the PDCCH. In this case, due to an instance of the blocking of the current beam used for PDCCH reception, the UE does not receive any PDCCH for entire time when the UE is in DRX operation.

When a UE does not receive any PDCCH correctly during a DRX ON period, to prevent the operation shown in FIG. 5, a UE needs to know if an access node sent a PDCCH or not in the DRX ON period. If the access node sent the PDCCH but the UE didn't receive it correctly, it means that the UE needs to update current serving beam for PDCCH reception. However, if the access node didn't send the PDCCH, and thus, the UE didn't receive it because the PDCCH simply did not exist, the UE simply needs to go to sleep state until next scheduled DRX ON period.

For this purpose, and to hasten synchronization process when a UE wakes up before the start of a DRX ON period, a concept of a wake up signal (WUS) can be considered. A WUS is transmitted before the start of DRX ON period to further save power consumption. The WUS may also be transmitted within the DRX ON period, as long as the WUS is transmitted prior to a transmission occasion of a PDCCH associated with the WUS. Such a DRX ON period is referred to as being associated with the particular WUS. The DRX ON period may alternatively be referred to as an expected DRX ON period of the particular WUS. Because a WUS is transmitted within a predetermined time window, either before the start of the associated DRX ON period or prior to the transmission of the PDCCH associated with the WUS, the WUS can help a UE obtain fast synchronization for PDCCH reception. A WUS may further indicate if a PDCCH transmission is expected during the associated DRX ON period. Moreover, based on the received signal quality of the WUS, a UE can identify if the currently serving beam for PDCCH reception is good or not.

When a UE does not receive any PDCCH correctly during a DRX ON period, a UE can identify if an access node sent a PDCCH or not in the DRX ON period by estimating a signal quality of the WUS sent before the start of (or within) the DRX ON period. That is, if the signal quality of the WUS is good but the UE didn't receive a PDCCH correctly, it implies that the access node didn't send the PDCCH. But if the signal quality of the WUS is not good and the UE didn't receive a PDCCH correctly, it means that the UE needs to update current serving beam for the PDCCH. For this reason, the WUS and the PDCCH need to use the same beam, or the WUS need to be QCL'ed with the PDCCH, or the WUS and the PDCCH need to have same QCL source.

Some reference signals such as CSI-RS or synchronization signals (SS) or physical broadcast channels (PBCH), or simply SS Block (SSB), may be used as the WUS. Other reference signals may also be used as the WUS. It is also noted that different terminology can also be used to refer to the WUS, which may include, but not be limited to, power save channel, power save signal, power save reference signal, power saving channel, power saving signal, power saving reference signal, etc.

For a PDCCH reception by a UE, there can be one or more search spaces and associated control resource sets (CORESET) configured for the UE. Furthermore, different CORESETs can be configured with different TCI states for QCL sources. Then, if multiple CORESETs are configured for a UE and the TCI states configured for different CORESETs are different, configuring a QCL source for a WUS is problematic. For example, because each CORESET can have its own periodicity, different CORESETs with different QCL sources can be scheduled at different DRX ON periods. Additionally, more than one CORESET with different QCL sources can be scheduled during a single DRX ON period. Then, if a QCL source for a WUS is explicitly configured, such as by RRC or MAC CE signaling, then because different CORESETs with different QCL sources can be scheduled at different DRX ON periods, and a WUS is supposed to occur at the beginning or right before each DRX ON period or before a PDCCH transmission occasion, it is not possible to explicitly configure the QCL source using RRC or MAC CE signaling unless an access node adjusts the QCL source for each DRX ON period.

According to an example embodiment, a spatial QCL source for a WUS is the same as a spatial QCL source of at least one CORESET scheduled during associated (or expected) DRX ON period. The common spatial QCL source for the WUS and the at least one CORESET scheduled during the associated DRX on period enables the UE to more readily perform the determination of whether or not an access node transmitted a PDCCH. Furthermore, the common spatial QCL source improves the probability of detecting the PDCCH. The common spatial QCL source requirement does not require that identical beams be used for transmitting both the WUS and the at least one CORESET. Rather, different beams may be used as long as the beams used have the common spatial QCL source.

In order for a UE to estimate which CORESET is scheduled during the associated DRX ON period, the UE needs to know the start and end time of the associated DRX ON period. However, because the actual DRX ON period varies depending on PDCCHs that are present (if any) and any accompanying PDSCH receptions, and because the UE does not know if a PDCCH will be received during the DRX ON period before the start of the DRX ON period, the UE cannot correctly estimate which CORESET is scheduled during the associated DRX ON period. For this reason, an expected DRX ON period may be used instead. The expected DRX ON period starts from the start of the DRX ON period and lasts a predetermined time duration, for example. An example of the predetermined time duration is the value of configured drx-onDurationTimer. Another example of the predetermined time duration is a duration of a DRX ON with no PDCCH received during the DRX ON period.

According to an example embodiment, the QCL source of all the CORESETs scheduled during an associated (expected) DRX ON period are the same, and the QCL source of a WUS is also the same as the QCL source of the CORESETs during the associated (expected) DRX ON period. For this purpose, an access node and a UE can have either an explicit or an implicit indication of the QCL source. In one embodiment, when a DRX operation is configured for a UE, the access node configures a QCL source of a CORESET for the UE to be the same for all CORESETs configured for the UE. Alternatively, when a DRX operation is configured for a UE, the access node indicates the same TCI state value for all CORESETs configured for the UE. In another embodiment, when a DRX operation is configured for a UE, regardless of configured TCI state value for each CORESET, the QCL source of the CORESET is changed to a predetermined value so that QCL source of all CORESETs are the same. There can be multiple variations of selecting the predetermined value. Some examples are shown below (but not limited to these examples):

QCL source of the first CORESET arriving in the DRX ON period,

QCL source of the CORESET with specific ID (e.g., the lowest ID),

QCL source of the CORESET that the UE successfully received most recently,

QCL source of the CORESET that is associated with a UE specific search space,

QCL source of the CORESET that is associated with specific common search space (e.g., a Type0-PDCCH common search space), SSB or a CSI-RS resource that is associated with PRACH resource(s), If there is only one search space scheduled in the associated DRX ON period, the CORESET that is associated with the only one search space scheduled in the associated DRX ON period, or Combinations of the above.

FIG. 6 illustrates a diagram 600 of a first example operation of QCL indication for each DRX cycle of a UE. In this example, for an associated (expected) DRX ON period 601 in a DRX cycle 602, 3 different CORESETs are expected in 3 different times: T0 610, T1 612, and T2 614. Additionally, at a predetermined time before the start of DRX ON period 601 or some time prior to a PDCCH transmission occasion (e.g., on the CORESETs at time T0 610, T1 612, and T2 614, a WUS 616 is transmitted by an access node. In this example, QCL sources of WUS 616, a CORESET in T0 610, a CORESET in T1 612, and a CORESET in T2 614 are all identical. Or similarly, WUS 616, the CORESET in T0 610, the CORESET in T1 612, and the CORESET in T2 614 are all QCL'ed together. Or similarly, a beam (or beam pair link (BPL) or QCL source) 630 for WUS 616, a beam (or BPL or QCL source) 632 for the CORESET in T0 610, a beam (or BPL or QCL source) 634 for the CORESET in T1 612, and a beam (or BPL or QCL source) 636 for the CORESET in T2 614 are identical. Therefore, if the UE receives WUS 616 correctly, the UE may receive a PDCCH during T0 610, T1 612, and T2 614 correctly, assuming that conditions have not significantly changed.

According to an example embodiment, an access node transmits a WUS before an associated (expected) DRX ON period for a UE or some time prior to a PDCCH transmission occasion, and during the associated (expected) DRX ON period, the access node transmits a PDCCH in one or more CORESETs that have the same QCL source with QCL source of associated WUS. Furthermore, the UE is not expected to monitor a CORESET that has different QCL source with the associated WUS. The access node can explicitly indicate the QCL source of the WUS. Additionally, the QCL source of the WUS can be the same with QCL source of a predetermined CORESET during the associated (expected) DRX ON period. There can be multiple variations of selecting the predetermined CORESET. Some examples of predetermined CORESETs are shown below (but not limited to these examples):

the first CORESET arriving in the DRX On period, the CORESET with specific ID (e.g., the lowest ID), the CORESET that the UE successfully received most recently, the CORESET that is associated with a UE specific search space, the CORESET that is associated with specific common search space (e.g., a Type0-PDCCH common search space), If there's only one search space scheduled in the associated DRX On period, the CORESET that is associated with the only one search space scheduled in the associated DRX On period, or Combinations of above mentioned.

In an embodiment, the access node does not transmit a PDCCH on a CORESET that is different from the predetermined CORESET during the associated DRX ON period.

FIG. 7 illustrates a diagram 700 of a second example operation of QCL indication for each DRX cycle of a UE. In this example, for an associated (expected) DRX ON period 701 in a DRX cycle 702, 3 different CORESETs are expected in 3 different times: T0 710, T1 712, and T2 714. At a predetermined time before the start of DRX ON period 701 or some time prior to a PDCCH transmission occasion, a WUS 716 is transmitted by an access node. In this example, QCL source 730 of the WUS 716 and QCL source 732 of a CORESET in T0 710 are identical, but QCL source 734 of a CORESET in T1 712 and QCL source 736 of a CORESET in T2 714 are different from QCL source 730 of the WUS 716. Hence, the UE only expects to monitor for PDCCH reception during T0 710 because its QCL source 732 is the same as QCL source 730 of the WUS 716, and the UE does not expect to monitor for PDCCH reception during T1 712 and T2 714 (marked X on QCL sources 734 and 736 of FIG. 7 to indicate that the UE does not monitor PDCCH during these times). Therefore, if the UE receives the WUS 716 correctly, the UE may receive a PDCCH during T0 710 correctly, assuming that conditions have not significantly changed.

According to an example embodiment, a WUS indicates if a PDCCH transmission by an access node is expected in a specific CORESET in an associated (expected) DRX ON period. When a UE receives a WUS before the start of an associated (expected) DRX ON period or some time before a PDCCH transmission occasion, the UE can identify which CORESET(s) within the (expected) DRX ON period the UE needs to monitor for PDCCH reception, and which CORESET(s) within the (expected) DRX ON period the UE can skip monitoring for PDCCH reception. In one example, a WUS can indicate or include an information bitmap, wherein each bit of the information bitmap corresponds to a CORESET within a predetermined order of CORESETs, and the setting of each bit of the information bitmap indicates to the UE if a PDCCH transmission by an access node is expected in the corresponding CORESET. In another example, the WUS is composed of one or more sequences, and use of different sequence indicates if a PDCCH transmission by an access node is expected in a corresponding CORESET (i.e., the CORESET that corresponds to the sequence transmitted as the WUS). In another example, the WUS is one type of DCI delivered in PDCCH, and the contents of the DCI includes an indicator indicating if a PDCCH transmission by an access node is expected in a specific CORESET in an associated (expected) DRX ON period.

FIG. 8 illustrates a diagram 800 of an example operation of CORESET indication in WUS for each DRX cycle of a UE. In this example, for an associated (expected) DRX ON period 801 in a DRX cycle 802, 3 different CORESETs are expected in 3 different times: T0 810, T1 812, and T2 814. At a predetermined time before the start of the DRX ON period 801 or some time before a PDCCH transmission occasion, a WUS 816 is transmitted by an access node. In this example, WUS 816 indicates that a PDCCH transmission by an access node is expected on a CORESET in T0 810 and a CORESET in T1 812. Then, because the UE knows the QCL source of the CORESET in T0 810 and the QCL source of the CORESET in T1 812, the UE can monitor for PDCCH during T0 810 and T1 812. If the UE does not receive any PDCCH during T0 810 or T1 812, then because the access node has already indicated that there is a PDCCH transmission during these times (by WUS 716), it implies that current beam associated with the CORESET that the UE didn't receive the PDCCH on correctly needs to be updated.

According to an example embodiment, a WUS indicates which search space or CORESET in an associated (expected) DRX ON period (expected during a non-zero drx-onDurationTimer duration) a PDCCH transmission by an access node is expected. As an example, if there are 2 search spaces or CORESETs (denoted C #0 and C #1 herein) scheduled in the associated DRX ON period, the WUS may include the following information (but not limited to these examples):

No PDCCH is expected in C #0 and C #1,
PDCCH is expected in C #0,
PDCCH is expected in C #1,
PDCCH is expected in C #0 and C #1.

According to an example embodiment, a WUS indicates if a PDCCH transmission is expected in an associated (expected) DRX ON period. If a UE receives the WUS correctly and the WUS indicates that a PDCCH transmission is expected in the associated (expected) DRX ON period but the UE does not receive any PDCCH during the associated (expected) DRX ON period, the UE transmits an indication to an access node that the UE needs to update current beam (or beam pair link). In one embodiment, this indication occurs when the QCL source of the WUS and the QCL source of a CORESET scheduled in the associated (expected) DRX ON period are different. In one example, the indication that the UE needs to update current beam initiates a beam refinement procedure between the UE and the access node. In another example, the indication that the UE needs to update current beam initiates a beam failure recovery procedure. In another example, a SSB or a CSI-RS is associated with PRACH resource(s), and if the UE receives a WUS indicating that a PDCCH is scheduled during an (expected) DRX ON period but the UE does not receive any PDCCH correctly, the UE may transmit the PRACH resource. In other words, if the UE fails to correctly receive any PDCCH, the UE may transmit resource. The PRACH resource may indicate that the UE needs to update current beam. In yet another example, the WUS is associated with a SSB or a CSI-RS, the SSB or the CSI-RS is also associated with PRACH resource(s), a PRACH resource itself, may indicate that the UE needs to update the current beam. In such an example, if the UE does not receive any PDCCH correctly, the transmission of the PRACH resource serves as an indicator that the UE needs to update the current beam.

In transmitting a PRACH resource, the UE is transmitting a request to perform a beam update procedure. In an example, transmitting the request to perform a beam update procedure involves the UE selecting a random access preamble out of a plurality of random access preambles and transmitting the selected random access preamble in a random access resource. In another example, transmitting the request to perform a beam update procedure involves the UE transmitting an allocated random access preamble in a random access resource, wherein the allocated random access preamble is allocated to indicate a control channel (e.g., the PDCCH) failure. In an embodiment, the request to perform the beam update procedure is transmitted on a beam different from a beam associated with the WUS, although the beams may have a common QCL source.

According to an example embodiment, if no search space or CORESET is scheduled during an associated (expected) DRX ON period of a UE, an access node does not send a WUS before the start of the associated (expected) DRX ON period or some time before a PDCCH transmission occasion. Therefore, the UE is not expected to receive a WUS before the start of an (expected) DRX ON period or some time before a PDCCH transmission occasion if no search space or CORESET is scheduled during the associated (expected) DRX ON period. The UE may determine that no search space or CORESET is schedule by examining the scheduling of CORESETs and determining (e.g., identifying) that there are no search space or CORESET scheduled during the associated (expected) DRX ON period. When the UE is not expecting to receive a WUS, the UE may deactivate WUS receiving, which may include stopping the monitoring for the WUS, stopping blind detecting for the WUS, stopping decoding for the WUS, and so forth. In an embodiment, the access node may send other signals at the expected transmission time of the WUS for this case. In another embodiment, if no search space or CORESET is scheduled during an associated (expected) DRX ON period, the UE stays in sleep state and does not monitor PDCCH reception during the associated DRX cycle. The drx-onDurationTimer, as it relates to a duration of time, may be used in an equivalent manner to DRX ON period.

According to an example embodiment, if a UE is already in Active state at an expected transmission time of a WUS for the UE, an access node does not send the WUS before the start of the associated (expected) DRX ON period or some time before a PDCCH transmission occasion. Therefore, the UE is not expected to receive a WUS before the start of the associated (expected) DRX ON period if a MAC entity of the UE is in Active Time at the expected transmission time of the WUS for the UE. When the UE is not expecting to receive a WUS, the UE may deactivate WUS receiving, which may include stopping the monitoring for the WUS, stopping blind detecting for the WUS, stopping decoding for the WUS, and so forth.

Figures 9A, 9B:
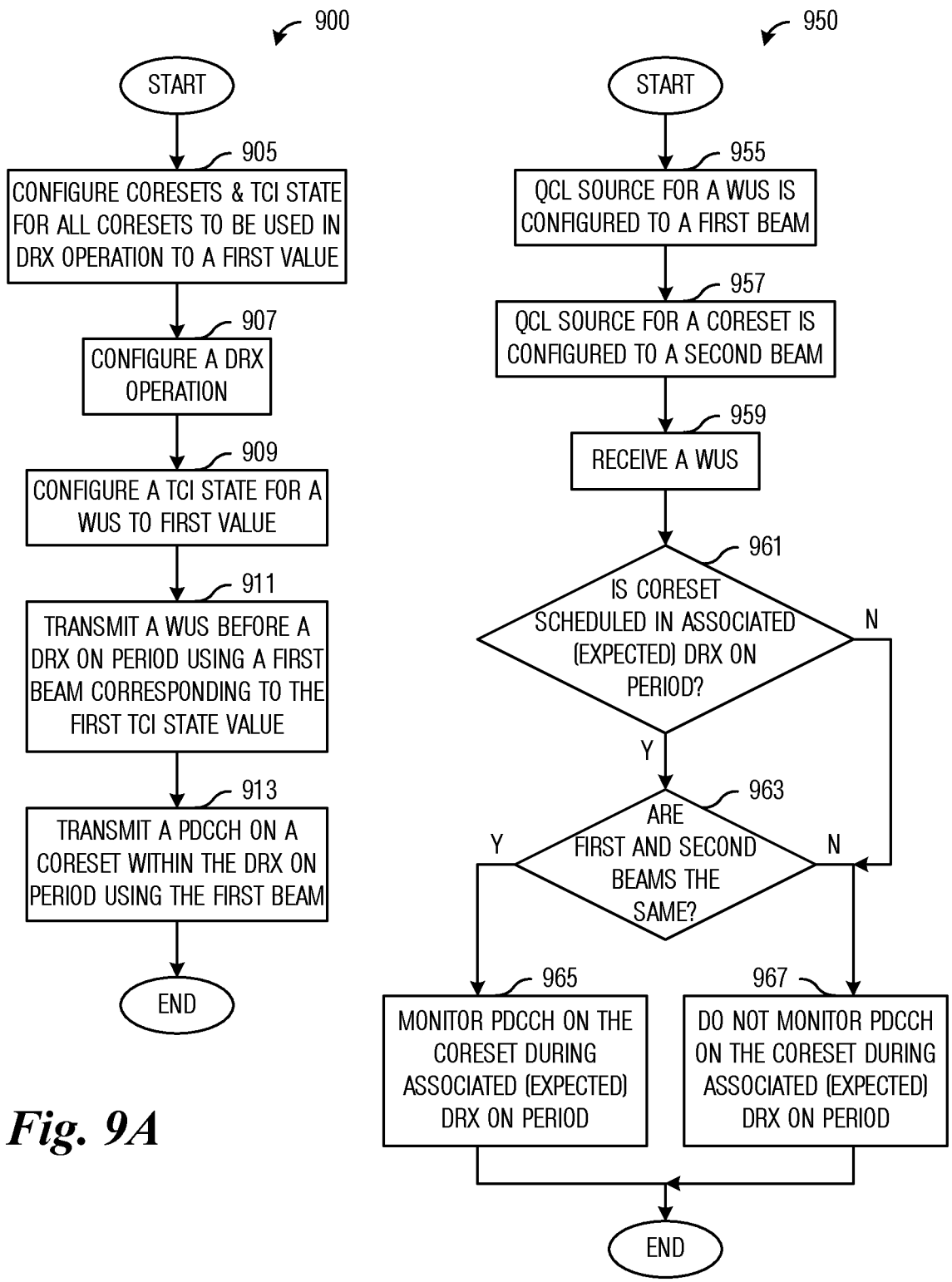
FIG. 9A illustrates a flow diagram of a first DRX operation occurring in an access node according to example embodiments described herein.
FIG. 9B illustrates a flow diagram of a second DRX operation occurring in a UE according to example embodiments described herein.

FIG. 9A illustrates a flow diagram 900 of a first DRX operation occurring in an access node according to example embodiments described herein. In this example, an access node configures one or more CORESETs for a UE to be used during a DRX operation, and TCI states for all of the one or more CORESETs is set to a first value (block 905). In general, the access node may configure the one or more CORESETs for the UE, and if the UE operates in DRX mode, the one or more CORESETs may occur during DRX ON periods. In other words, the one or more CORESETs configured for the UE may or may not be separately configured for the UE for use during DRX operation. The access node also configures a DRX operation for the UE (block 907). For the DRX operation, the access node configures a WUS transmission before the start of an associated (expected) DRX ON period or some time before a PDCCH transmission occasion, and the access node configures TCI state for the WUS to be the first value (block 909). Then, as the UE operates in the DRX mode, the access node transmits the WUS at an expected transmission time of the WUS before the associated (expected) DRX ON period (or some time before a PDCCH transmission occasion) using a first beam, wherein the first beam corresponds to the first TCI state value (block 911). During the associated (expected) DRX ON period, the access node transmits a PDCCH on a CORESET using the first beam (block 913). Therefore, the UE can receive the PDCCH correctly using a correct beam in case the UE successfully receives the WUS.

FIG. 9B illustrates a flow diagram 950 of a second DRX operation occurring in a UE according to example embodiments described herein. In this example, QCL source for a WUS is configured to a first reference signal (RS) using a first beam for a UE to be used for DRX operation (block 955). Moreover, QCL source for a CORESET is configured to a second RS using a second beam for the UE (block 957). Under this configuration and when a DRX operation is configured for the UE, before the start of a DRX ON period or some time before a PDCCH transmission occasion, the UE receives a WUS (block 959). Then, if the CORESET is scheduled in an associated (expected) DRX ON period (block 961), the UE checks if the first and second beams are the same or not (block 963). If the first and second beams are the same, or in other words if the first and the second RS are the same or if the QCL sources are the same (block 963), the UE monitors PDCCH on the CORESET (block 965). If the CORESET is not scheduled in the associated (expected) DRX ON period (block 961) or if the first and the second beam are not the same (block 963), the UE does not monitor the CORESET (block 967).

Figure 10:
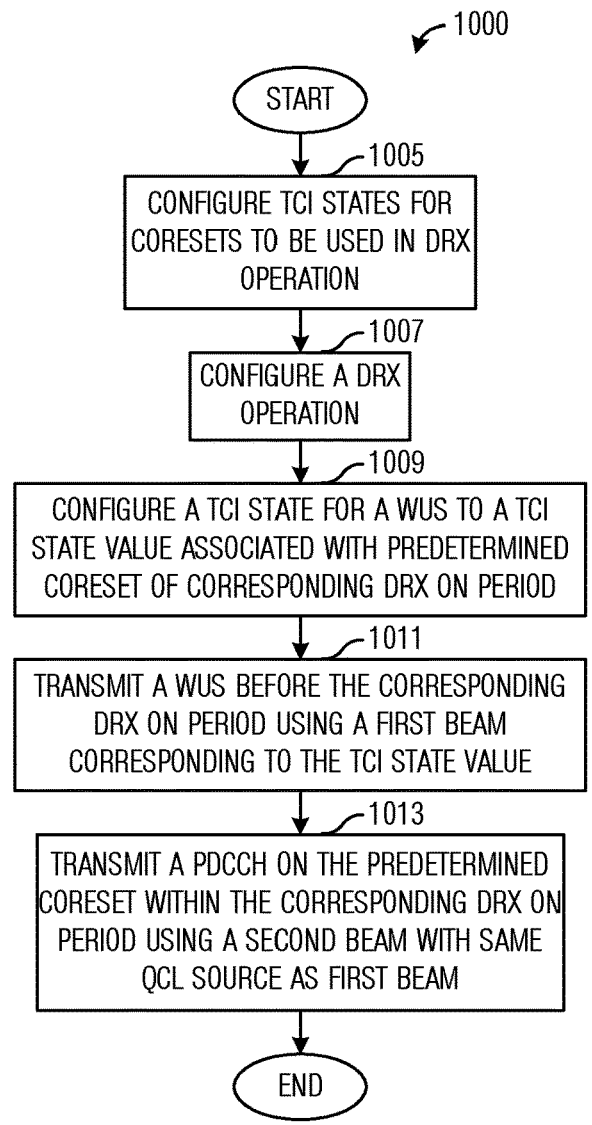
FIG. 10 illustrates a flow diagram of a third DRX operation occurring in an access node according to example embodiments described herein.

FIG. 10 illustrates a flow diagram 1000 of a third DRX operation occurring in an access node according to example embodiments described herein. In this example, an access node configures multiple CORESETs for a UE to be used during a DRX operation, and TCI states for the CORESETs are set to different values (block 1005). In other words, more than one CORESETs out of the multiple CORESETs may be assigned the same TCI state or the same set of TCI states. The access node also configures a DRX operation for the UE (block 1007). For the DRX operation, the access node configures a WUS transmission before the start of an associated (expected) DRX ON period, and the access node configures a TCI state for the WUS to a value associated with a predetermined CORESET of the associated (expected) DRX ON period (block 1009). Then, as the UE operates in the DRX mode, the access node transmits the WUS at an expected transmission time of the WUS before the associated (expected) DRX ON period using a first beam, wherein the first beam corresponds to the TCI state value (block ion). During the associated (expected) DRX ON period, the access node transmits a PDCCH on the predetermined CORESET using the first beam (block 1013). Therefore, the UE can receive the PDCCH correctly using a correct beam in case the UE successfully receives the WUS.

Figure 11:
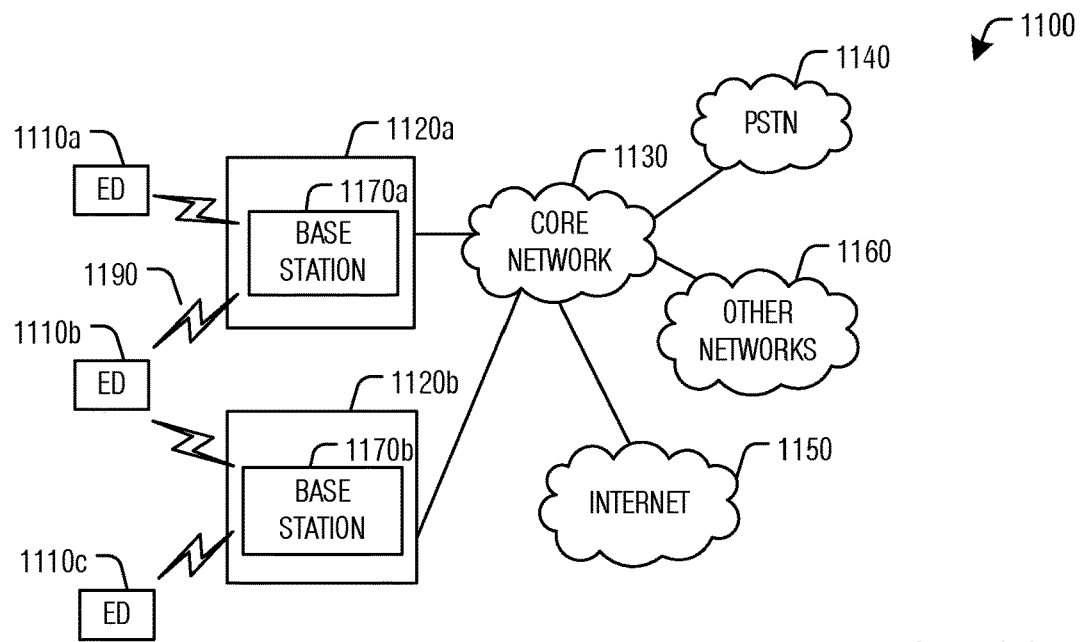
FIG. 11 illustrates an example communication system according to example embodiments presented herein.

FIG. 11 illustrates an example communication system 1100. In general, the system 1100 enables multiple wireless or wired users to transmit and receive data and other content. The system 1100 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 11, any number of these components or elements may be included in the system 1100.

The EDs 1110a-1110c are configured to operate or communicate in the system 1100. For example, the EDs 1110a-1110c are configured to transmit or receive via wireless or wired communication channels. Each ED 1110a-1110c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1120a-1120b here include base stations 1170a-1170b, respectively. Each base station 1170a-1170b is configured to wirelessly interface with one or more of the EDs 1110a-1110c to enable access to the core network 1130, the PSTN 1140, the Internet 1150, or the other networks 1160. For example, the base stations 1170a-1170b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1110a-1110c are configured to interface and communicate with the Internet 1150 and may access the core network 1130, the PSTN 1140, or the other networks 1160.

In the embodiment shown in FIG. 11, the base station 1170a forms part of the RAN 1120a, which may include other base stations, elements, or devices. Also, the base station 1170b forms part of the RAN mob, which may include other base stations, elements, or devices. Each base station 1170a-1170b operates to transmit or receive wireless signals within a particular geographic region or area, sometimes referred to as a "cell." In some embodiments, multiple-input multiple-output (MIMO) technology may be employed having multiple transceivers for each cell.

The base stations 1170a-1170b communicate with one or more of the EDs 1110a-1110c over one or more air interfaces 1190 using wireless communication links. The air interfaces 1190 may utilize any suitable radio access technology.

It is contemplated that the system 1100 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1120a-1120b are in communication with the core network 1130 to provide the EDs 1110a-1110c with voice, data, application, Voice over Internet Protocol (VoIP), or other services. Understandably, the RANs 1120a-1120b or the core network 1130 may be in direct or indirect communication with one or more other RANs (not shown). The core network 1130 may also serve as a gateway access for other networks (such as the PSTN 1140, the Internet 1150, and the other networks 1160). In addition, some or all of the EDs 1110a-1110c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1150.

Although FIG. 11 illustrates one example of a communication system, various changes may be made to FIG. 11. For example, the communication system 1100 could include any number of EDs, base stations, networks, or other components in any suitable configuration.

Figure 12A:
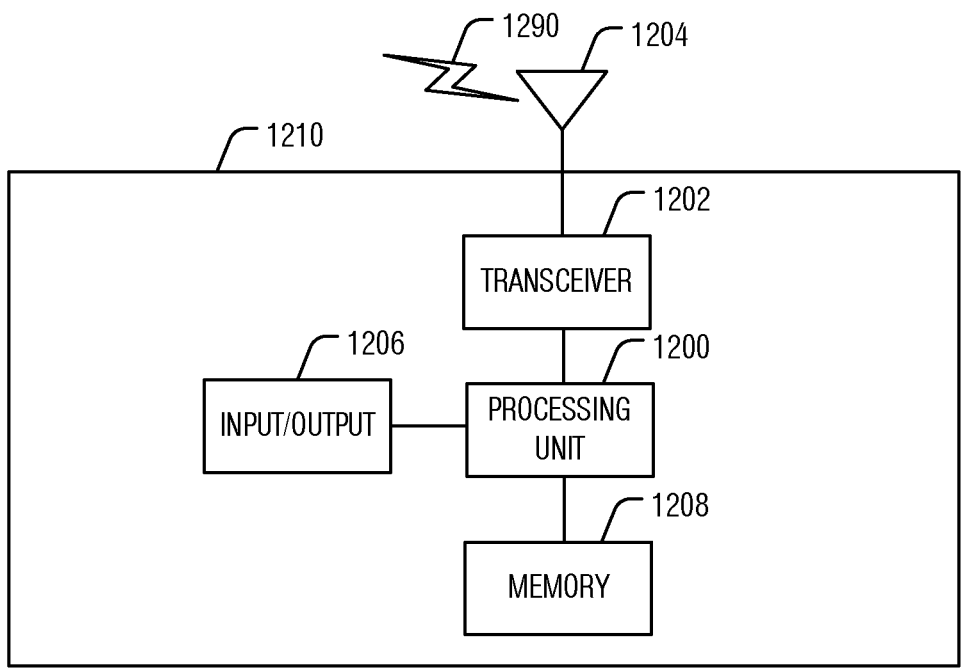
FIGS. 12A and 12B illustrate example devices that may implement the methods and teachings according to this disclosure.
Figure 12B:
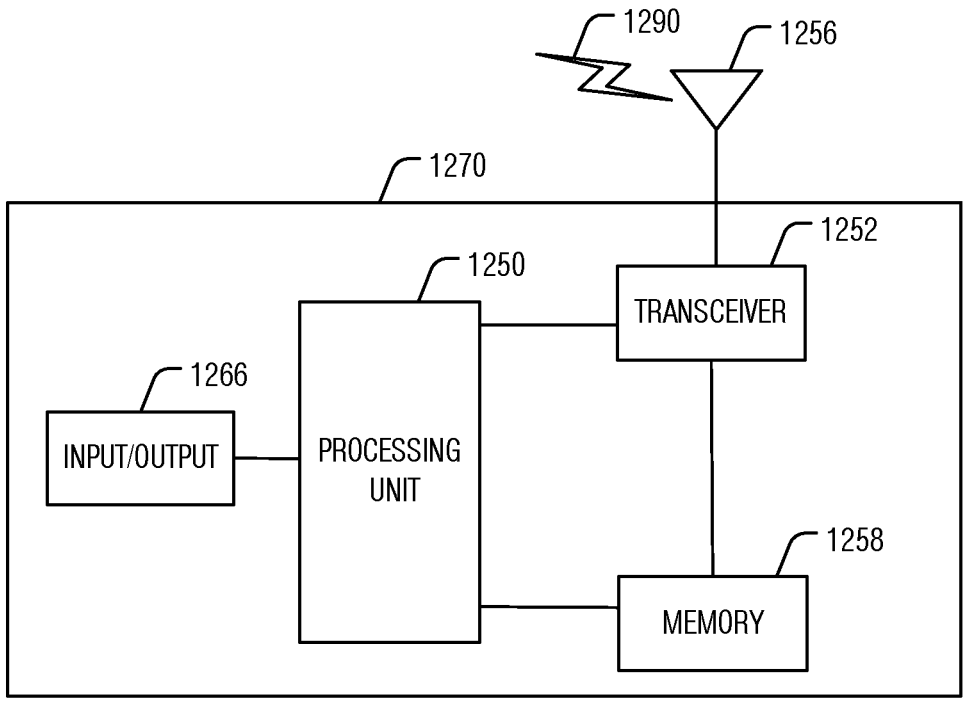

FIGS. 12A and 12B illustrate example devices that may implement the methods and teachings according to this disclosure. In particular, FIG. 12A illustrates an example ED 1210, and FIG. 12B illustrates an example base station 1270. These components could be used in the system 1100 or in any other suitable system.

As shown in FIG. 12A, the ED 1210 includes at least one processing unit 1200. The processing unit 1200 implements various processing operations of the ED 1210. For example, the processing unit 1200 could perform signal coding, data processing, power control, input/output processing, or any other functionality enabling the ED 1210 to operate in the system 1100. The processing unit 1200 also supports the methods and teachings described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1210 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless or wired transmission or processing signals received wirelessly or by wire. Each antenna 1204 includes any suitable structure for transmitting or receiving wireless or wired signals. One or multiple transceivers 1202 could be used in the ED 1210, and one or multiple antennas 1204 could be used in the ED 1210. Although shown as a single functional unit, a transceiver 1202 could also be implemented using at least one transmitter and at least one separate receiver.

The ED 1210 further includes one or more input/output devices 1206 or interfaces (such as a wired interface to the Internet 1150). The input/output devices 1206 facilitate interaction with a user or other devices (network communications) in the network. Each input/output device 1206 includes any suitable structure for providing information to or receiving information from a user, such as a speaker, microphone, keypad, keyboard, display, or touch screen, including network interface communications.

In addition, the ED 1210 includes at least one memory 1208. The memory 1208 stores instructions and data used, generated, or collected by the ED 1210. For example, the memory 1208 could store software or firmware instructions executed by the processing unit(s) 1200 and data used to reduce or eliminate interference in incoming signals. Each memory 1208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 1270 includes at least one processing unit 1250, at least one transceiver 1252, which includes functionality for a transmitter and a receiver, one or more antennas 1256, at least one memory 1258, and one or more input/output devices or interfaces 1266. A scheduler, which would be understood by one skilled in the art, is coupled to the processing unit 1250. The scheduler could be included within or operated separately from the base station 1270. The processing unit 1250 implements various processing operations of the base station 1270, such as signal coding, data processing, power control, input/output processing, or any other functionality. The processing unit 1250 can also support the methods and teachings described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transceiver 1252 includes any suitable structure for generating signals for wireless or wired transmission to one or more EDs or other devices. Each transceiver 1252 further includes any suitable structure for processing signals received wirelessly or by wire from one or more EDs or other devices. Although shown combined as a transceiver 1252, a transmitter and a receiver could be separate components. Each antenna 1256 includes any suitable structure for transmitting or receiving wireless or wired signals. While a common antenna 1256 is shown here as being coupled to the transceiver 1252, one or more antennas 1256 could be coupled to the transceiver(s) 1252, allowing separate antennas 1256 to be coupled to the transmitter and the receiver if equipped as separate components. Each memory 1258 includes any suitable volatile or non-volatile storage and retrieval device(s). Each input/output device 1266 facilitates interaction with a user or other devices (network communications) in the network. Each input/output device 1266 includes any suitable structure for providing information to or receiving/providing information from a user, including network interface communications.

Figure 13:
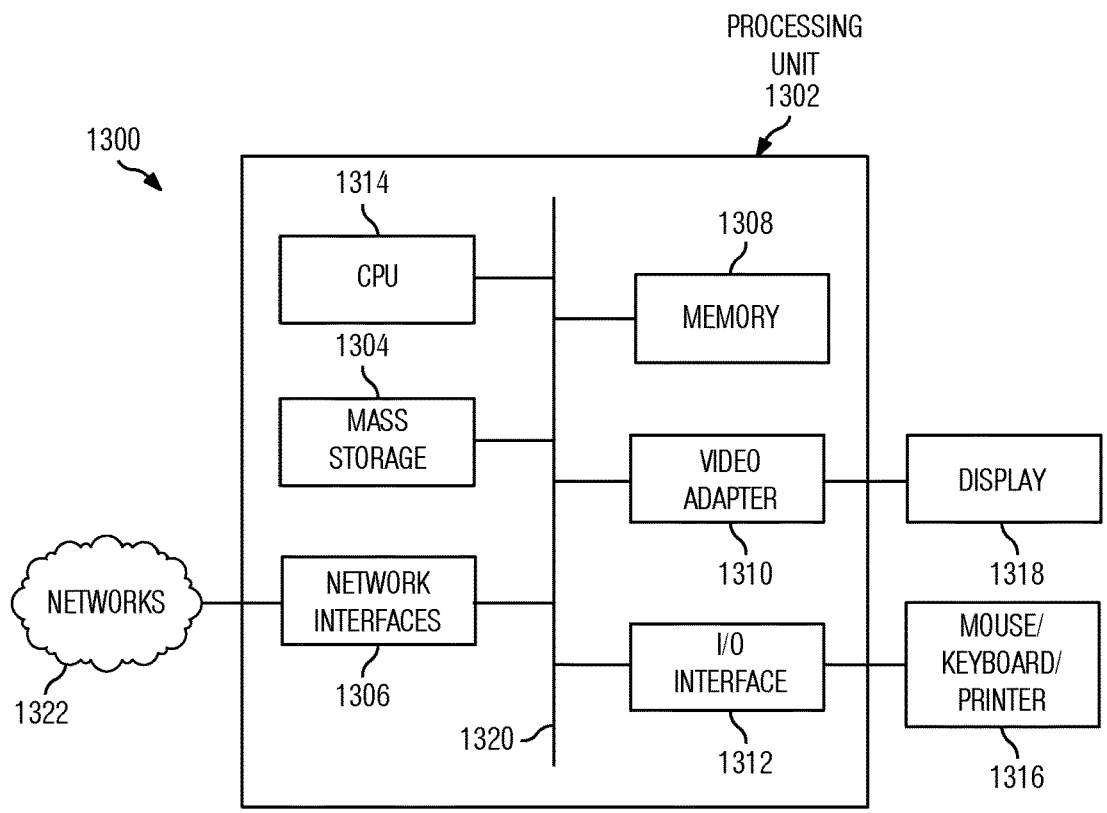
FIG. 13 illustrates a block diagram of a computing system that may be used for implementing the devices and methods disclosed herein.

FIG. 13 is a block diagram of a computing system 1300 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1300 includes a processing unit 1302. The processing unit includes a central processing unit (CPU) 1314, memory 1308, and may further include a mass storage device 1304, a video adapter 1310, and an I/O interface 1312 connected to a bus 1320.

The bus 1320 may be one or more of any type of several bus architectures including a memory bus or memory controller, a peripheral bus, or a video bus. The CPU 1314 may comprise any type of electronic data processor. The memory 1308 may comprise any type of non-transitory system memory such as static random access memory (SRAM), dynamic random access memory (DRAM), synchronous DRAM (SDRAM), read-only memory (ROM), or a combination thereof. In an embodiment, the memory 1308 may include ROM for use at boot-up, and DRAM for program and data storage for use while executing programs.

The mass storage 1304 may comprise any type of non-transitory storage device configured to store data, programs, and other information and to make the data, programs, and other information accessible via the bus 1320. The mass storage 1304 may comprise, for example, one or more of a solid state drive, hard disk drive, a magnetic disk drive, or an optical disk drive.

The video adapter 1310 and the I/O interface 1312 provide interfaces to couple external input and output devices to the processing unit 1302. As illustrated, examples of input and output devices include a display 1318 coupled to the video adapter 1310 and a mouse, keyboard, or printer 1316 coupled to the I/O interface 1312. Other devices may be coupled to the processing unit 1302, and additional or fewer interface cards may be utilized. For example, a serial interface such as Universal Serial Bus (USB) (not shown) may be used to provide an interface for an external device.

The processing unit 1302 also includes one or more network interfaces 1306, which may comprise wired links, such as an Ethernet cable, or wireless links to access nodes or different networks. The network interfaces 1306 allow the processing unit 1302 to communicate with remote units via the networks. For example, the network interfaces 1306 may provide wireless communication via one or more transmitters/transmit antennas and one or more receivers/receive antennas. In an embodiment, the processing unit 1302 is coupled to a local-area network 1322 or a wide-area network for data processing and communications with remote devices, such as other processing units, the Internet, or remote storage facilities.

Figure 14:
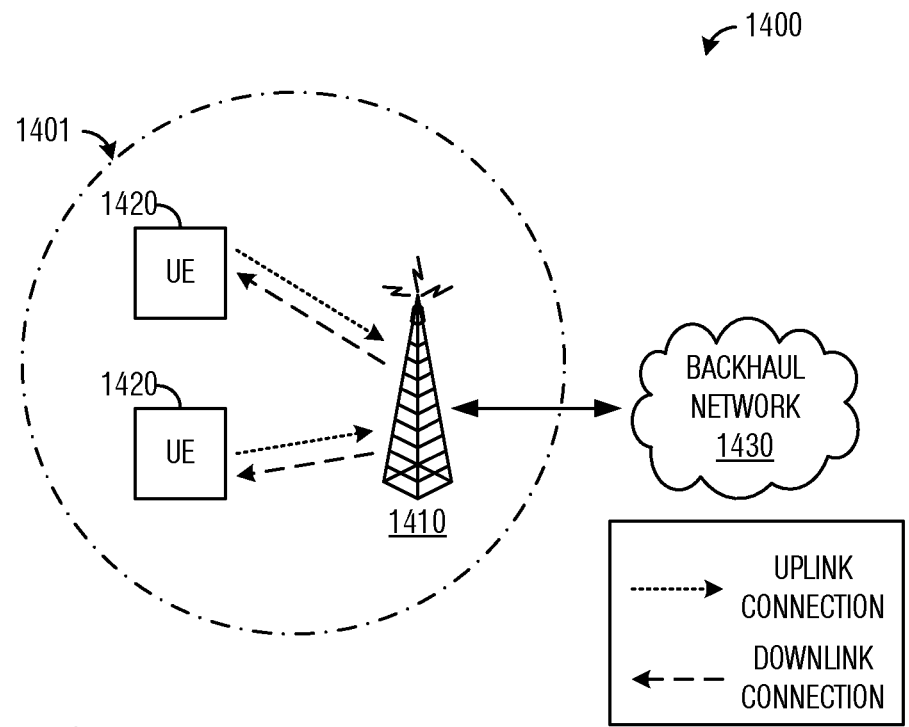
FIG. 14 illustrates a diagram of a network for communicating data according to example embodiments presented herein.

FIG. 14 is a diagram of a network 1400 for communicating data. The network 1400 includes a base station 1410 having a coverage area 1401, a plurality of UEs 1420, and a backhaul network 1430. As shown, base station 1410 establishes uplink (dashed line) and/or downlink (dotted line) connections with UEs 1420, which serve to carry data from UEs 1420 to base station 1410 and vice-versa. Data communicated over the uplink/downlink connections may include data communicated between UEs 1420, as well as data communicated to/from a remote-end (not shown) by way of backhaul network 1430. As used herein, base station refers to any network-side device configured to provide wireless access to a network, such as an enhanced Node B, a gNB, a transmit/receive point (TRP), a macro-cell, a femtocell, a Wi-Fi Access Point, and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, UE refers to any user-side device configured to access a network by establishing a wireless connection with a base station, such as a mobile device, a mobile station, a vehicle, and other wirelessly enabled devices. In some embodiments, the network 1400 may include various other wireless devices, such as relays, low power nodes, etc. While it is understood that communication systems may employ multiple access nodes capable of communicating with a number of UEs, only one base station 1410, and two UEs 1420 are illustrated for simplicity.

Figure 15:
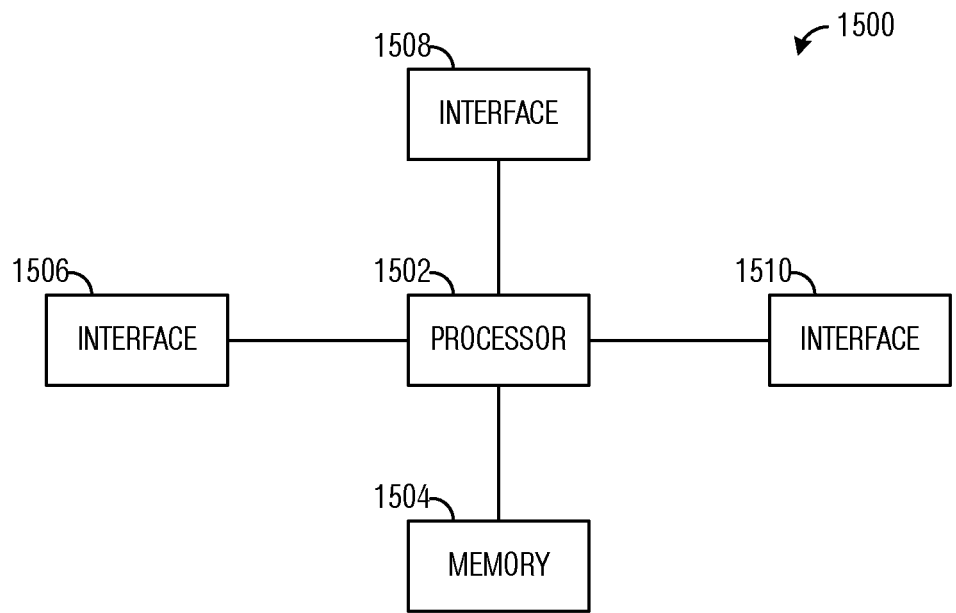
FIG. 15 illustrates a block diagram of another embodiment processing system 1500 for performing methods described herein.

FIG. 15 illustrates a block diagram of another embodiment processing system 1500 for performing methods described herein, which may be installed in a host device. As shown, processing system 1500 includes a processor 1502, a memory 1504, and interfaces 1506, 1508, 1510 which may (or may not) be arranged as shown in FIG. 15. Processor 1502 may be any component or collection of components adapted to perform computations and/or other processing related tasks, and memory 1504 may be any component or collection of components adapted to store programming and/or instructions for execution by processor 1502. In an embodiment, memory 1504 includes a non-transitory computer readable medium. Interfaces 1506, 1508, 1510 may be any component or collection of components that allow processing system 1500 to communicate with other devices/components and/or a user. In an embodiment, one or more of interfaces 1506, 1508, 1510 may be adapted to communicate data, control, or management messages from processor 1502 to applications installed on the host device and/or a remote device. As another embodiment, one or more of interfaces 1506, 1508, 1510 may be adapted to allow a user or user device (e.g., personal computer (PC), etc.) to interact/communicate with processing system 1500. Processing system 1500 may include additional components not depicted in FIG. 15, such as long-term storage (e.g., non-volatile memory, etc.).

In some embodiments, processing system 1500 is included in a network device that is accessing, or part otherwise of, a telecommunications network. In one embodiment, processing system 1500 is in a network-side device in a wireless or wireline telecommunications network, such as a base station, a relay station, a scheduler, a controller, a gateway, a router, an applications server, or any other device in the telecommunications network. In other embodiments, processing system 1500 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 16:
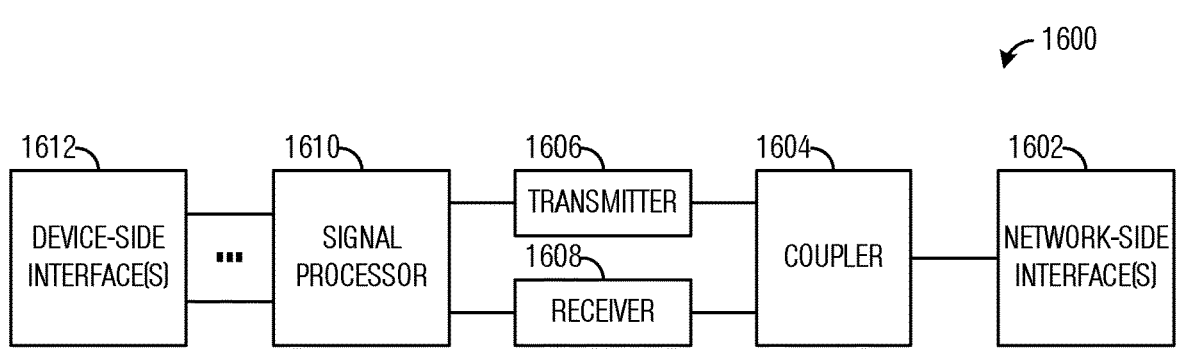
FIG. 16 illustrates a block diagram of a transceiver adapted to transmit and receive signaling over a telecommunications network according to example embodiments presented herein.

In some embodiments, one or more of interfaces 1506, 1508, 1510 connects processing system 1500 to a transceiver adapted to transmit and receive signaling over the telecommunications network. FIG. 16 illustrates a block diagram of a transceiver 1600 adapted to transmit and receive signaling over a telecommunications network. Transceiver 1600 may be installed in a host device. As shown, transceiver 1600 comprises a network-side interface 1602, a coupler 1604, a transmitter 1606, a receiver 1608, a signal processor 1610, and a device-side interface 1612. Network-side interface 1602 may include any component or collection of components adapted to transmit or receive signaling over a wireless or wireline telecommunications network. Coupler 1604 may include any component or collection of components adapted to facilitate bi-directional communication over network-side interface 1602. Transmitter 1606 may include any component or collection of components (e.g., up-converter, power amplifier, etc.) adapted to convert a baseband signal into a modulated carrier signal suitable for transmission over network-side interface 1602. Receiver 1608 may include any component or collection of components (e.g., down-converter, low noise amplifier, etc.) adapted to convert a carrier signal received over network-side interface 1602 into a baseband signal. Signal processor 1610 may include any component or collection of components adapted to convert a baseband signal into a data signal suitable for communication over device-side interface(s) 1612, or vice-versa. Device-side interface(s) 1612 may include any component or collection of components adapted to communicate data-signals between signal processor 1610 and components within the host device (e.g., processing system 1500, local area network (LAN) ports, etc.).

Transceiver 1600 may transmit and receive signaling over any type of communications medium. In some embodiments, transceiver 1600 transmits and receives signaling over a wireless medium. In some embodiments, transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, network-side interface 1602 comprises one or more antenna/radiating elements. In some embodiments, network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit or module, or a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The invention claimed is:

1. A method comprising:
   connecting, by a user equipment (UE), to a cellular network in a discontinuous reception (DRX) mode;
   determining, by the UE, that a media access control (MAC) entity of the UE will be in DRX Active Time during a portion of a scheduled wakeup indication monitoring time for monitoring for a first wakeup indication, wherein the first wakeup indication indicates the UE to monitor a physical downlink control channel (PDCCH) reception during a first DRX ON period following the scheduled wakeup indication monitoring time of the first wakeup indication; and
   not monitoring, by the UE, the PDCCH for reception of the first wakeup indication, during the portion of the scheduled wakeup indication monitoring time that overlaps a duration during which the UE will be in the DRX Active Time.

2. The method of claim 1, wherein the scheduled wakeup indication monitoring time further includes a second portion outside the DRX Active Time, the method further comprising:
   monitoring, by the UE, the PDCCH for the reception of the first wakeup indication during the second portion of the scheduled wakeup indication monitoring time.

3. The method of claim 1, wherein the first wakeup indication is received within a predetermined time window before the first DRX ON period.

4. The method of claim 1, further comprising:
   receiving, by the UE, a second wakeup indication, wherein the second wakeup indication indicates the UE to monitor a second PDCCH reception during a second DRX ON period; and
   monitoring, by the UE, reception of the second PDCCH reception during the second DRX ON period after receiving the second wakeup indication.

5. The method of claim 4, wherein the second wakeup indication is received at a predetermined time window before the second DRX ON period.

6. The method of claim 1, wherein the DRX Active Time includes a time while a Scheduling Request is sent on a physical uplink control channel (PUCCH) and is pending.

7. The method of claim 1, wherein the DRX Active Time includes a time while the PDCCH indicating a new transmission addressed to a cell-radio network temporary identifier (C-RNTI) of the MAC entity has not been received after successful reception of a Random Access Response (RAR) for a Random Access Preamble (RAP) not selected by the MAC entity among a contention-based Random Access Preamble.

8. The method of claim 1, wherein the DRX Active Time is before the first DRX ON period.

9. A user equipment (UE) comprising:
   at least one processor; and
   a non-transitory computer readable storage medium storing programming, the programming including instructions that, when executed by the at least one processor, cause the UE to perform operations including:
     connecting to a cellular network in a discontinuous reception (DRX) mode;
     determining that a media access control (MAC) entity of the UE will be in DRX Active Time during a portion of a scheduled wakeup indication monitoring time for monitoring for a first wakeup indication, wherein the first wakeup indication indicates the UE to monitor a physical downlink control channel (PDCCH) reception during a first DRX ON period following the scheduled wakeup indication monitoring time of the first wakeup indication; and
     not monitoring the PDCCH for reception of the first wakeup indication, during the portion of the scheduled wakeup indication monitoring time that overlaps a duration during which the UE will be in the DRX Active Time.

10. The UE of claim 9, wherein the scheduled wakeup indication monitoring time further includes a second portion outside the DRX Active Time, the operations further comprising:
    monitoring the PDCCH for the reception of the first wakeup indication during the second portion of the scheduled wakeup indication monitoring time.

11. The UE of claim 9, wherein the first wakeup indication is received within a predetermined time window before the first DRX ON period.

12. The UE of claim 9, the operations further comprising:
    receiving a second wakeup indication, wherein the second wakeup indication indicates the UE to monitor a second PDCCH reception during a second DRX ON period; and
    monitoring reception of the second PDCCH reception during the second DRX ON period after receiving the second wakeup indication.

13. The UE of claim 12, wherein the second wakeup indication is received at a predetermined time window before the second DRX ON period.

14. The UE of claim 9, wherein the DRX Active Time includes a time while a Scheduling Request is sent on a physical uplink control channel (PUCCH) and is pending.

15. The UE of claim 9, wherein the DRX Active Time includes a time while the PDCCH indicating a new transmission addressed to a cell-radio network temporary identifier (C-RNTI) of the MAC entity has not been received after successful reception of a Random Access Response (RAR) for a Random Access Preamble (RAP) not selected by the MAC entity among a contention-based Random Access Preamble.

16. The UE of claim 9, wherein the DRX Active Time is before the first DRX ON period.

17. A method comprising:
connecting, by a base station in a cellular network, with a user equipment (UE) in a discontinuous reception (DRX) mode;
determining, by the base station, that a media access control (MAC) entity of the UE will be in DRX Active Time during a portion of a scheduled wakeup indication monitoring time for monitoring for a first wakeup indication, wherein the first wakeup indication indicates the UE to monitor a physical downlink control channel (PDCCH) transmission during a first DRX ON period following the scheduled wakeup indication monitoring time of the first wakeup indication; and
not transmitting, by the base station, the first wakeup indication, during the portion of the scheduled wakeup indication monitoring time that overlaps a duration during which the UE will be in the DRX Active Time.

18. The method of claim 17, wherein the scheduled wakeup indication monitoring time further includes a second portion outside the DRX Active Time, the method further comprising:
transmitting, by the base station, the first wakeup indication during the second portion of the scheduled wakeup indication monitoring time.

19. The method of claim 17, wherein the first wakeup indication is transmitted within a predetermined time window before the first DRX ON period.

20. The method of claim 17, further comprising:
transmitting, by the base station, a second wakeup indication, wherein the second wakeup indication indicates the UE to monitor a second PDCCH transmission during a second DRX ON period; and
transmitting, by the base station, the second PDCCH transmission during the second DRX ON period after transmitting the second wakeup indication.

21. The method of claim 20, wherein the second wakeup indication is transmitted at a predetermined time window before the second DRX ON period.

22. The method of claim 17, wherein the DRX Active Time includes a time while a Scheduling Request is received on a physical uplink control channel (PUCCH) and is pending.

23. The method of claim 17, wherein the DRX Active Time includes a time while the PDCCH indicating a new transmission addressed to a cell-radio network temporary identifier (C-RNTI) of the MAC entity has not been received after successful reception of a Random Access Response (RAR) for a Random Access Preamble (RAP) not selected by the MAC entity among a contention-based Random Access Preamble.

24. The method of claim 17, wherein the DRX Active Time is before the first DRX ON period.

25. A base station comprising:
at least one processor; and
a non-transitory computer readable storage medium storing programming, the programming including instructions that, when executed by the at least one processor, cause the base station to perform operations including:
connecting with a user equipment (UE) in a discontinuous reception (DRX) mode;
determining that a media access control (MAC) entity of the UE will be in DRX Active Time during a portion of a scheduled wakeup indication monitoring time for monitoring for a first wakeup indication, wherein the first wakeup indication indicates the UE to monitor a physical downlink control channel (PDCCH) transmission during a first DRX ON period following the scheduled wakeup indication monitoring time of the first wakeup indication; and
not transmitting the first wakeup indication, during the portion of the scheduled wakeup indication monitoring time that overlaps a duration during which the UE will be in the DRX Active Time.

26. The base station of claim 25, wherein the scheduled wakeup indication monitoring time further includes a second portion outside the DRX Active Time, the operations further comprising:
transmitting the first wakeup indication during the second portion of the scheduled wakeup indication monitoring time.

27. The base station of claim 25, wherein the first wakeup indication is transmitted within a predetermined time window before the first DRX ON period.

28. The base station of claim 25, the operations further comprising:
transmitting a second wakeup indication, wherein the second wakeup indication indicates the UE to monitor a second PDCCH transmission during a second DRX ON period; and
transmitting the second PDCCH transmission during the second DRX ON period after transmitting the second wakeup indication.

29. The base station of claim 28, wherein the second wakeup indication is transmitted at a predetermined time window before the second DRX ON period.

30. The base station of claim 25, wherein the DRX Active Time includes a time while a Scheduling Request is received on a physical uplink control channel (PUCCH) and is pending.

31. The base station of claim 25, wherein the DRX Active Time includes a time while the PDCCH indicating a new transmission addressed to a cell-radio network temporary identifier (C-RNTI) of the MAC entity has not been received after successful reception of a Random Access Response (RAR) for a Random Access Preamble (RAP) not selected by the MAC entity among a contention-based Random Access Preamble.

32. The base station of claim 25, wherein the DRX Active Time is before the first DRX ON period.

* * * * *

UNITED STATES PATENT AND TRADEMARK OFFICE
CERTIFICATE OF CORRECTION

| | | |
|---|---|---|
| PATENT NO. | : 12,452,787 B2 | Page 1 of 1 |
| APPLICATION NO. | : 18/150858 | |
| DATED | : October 21, 2025 | |
| INVENTOR(S) | : Kwon et al. | |

It is certified that error appears in the above-identified patent and that said Letters Patent is hereby corrected as shown below:

In the Specification

In Column 12, Line 36, delete "RTF" and insert -- RTT --.

Signed and Sealed this
Ninth Day of December, 2025

John A. Squires
*Director of the United States Patent and Trademark Office*